(12) United States Patent
Srivastava et al.

(10) Patent No.: US 12,432,324 B2
(45) Date of Patent: Sep. 30, 2025

(54) METHODS AND APPARATUS FOR CAMERA ASSISTED GEOMETRIC CORRECTION

(71) Applicant: Texas Instruments Incorporated, Dallas, TX (US)

(72) Inventors: Shivam Srivastava, Bangalore (IN); Jaime De La Cruz, Carrollton, TX (US); Jeffrey Kempf, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 647 days.

(21) Appl. No.: 17/711,685

(22) Filed: Apr. 1, 2022

(65) Prior Publication Data

US 2023/0316468 A1 Oct. 5, 2023

(51) Int. Cl.
| | | |
|---|---|---|
| *H04N 9/31* | (2006.01) | |
| *G06T 3/04* | (2024.01) | |
| *G06T 3/18* | (2024.01) | |
| *G06T 5/50* | (2006.01) | |
| *G06T 5/80* | (2024.01) | |
| *G06T 7/521* | (2017.01) | |
| *G06T 7/73* | (2017.01) | |

(52) U.S. Cl.
CPC .......... *H04N 9/3185* (2013.01); *G06T 3/04* (2024.01); *G06T 3/18* (2024.01); *G06T 5/50* (2013.01); *G06T 5/80* (2024.01); *G06T 7/521* (2017.01); *G06T 7/74* (2017.01); *H04N 9/3147* (2013.01); *H04N 9/3194* (2013.01); *G06T 2207/10028* (2013.01); *H04N 9/3102* (2013.01)

(58) Field of Classification Search
CPC .... G06T 5/80; G06T 3/04; G06T 3/18; G06T 5/50; G06T 7/521; G06T 7/74; G06T 2207/10028; G06T 2207/20076; G06T 2207/20084; G06T 7/55; H04N 9/3147; H04N 9/3185; H04N 9/3194; H04N 9/3102
USPC .......................................................... 353/69
See application file for complete search history.

(56) References Cited

U.S. PATENT DOCUMENTS

| | | | |
|---|---|---|---|
| 10,681,318 B2 | 6/2020 | De La Cruz et al. | |
| 2015/0178412 A1* | 6/2015 | Grau | G01B 21/047 703/1 |
| 2015/0254819 A1* | 9/2015 | Hara | G06T 5/80 345/647 |
| 2017/0180689 A1* | 6/2017 | Morrison | H04N 9/3194 |
| 2019/0166339 A1* | 5/2019 | De La Cruz | G06T 5/80 |

(Continued)

*Primary Examiner* — Magda Cruz
(74) *Attorney, Agent, or Firm* — Michael T. Gabrik; Frank D. Cimino

(57) ABSTRACT

An example apparatus includes: a controller configured to: generate a pattern of points; obtain a first image of a first reflection of a projection of the pattern of points from a first camera; generate a first point cloud having a first coordinate system based on the first image; obtain a second image of a second reflection of the projection of the pattern of points from a second camera; generate a second point cloud having a second coordinate system based on the second image; determine a rigid body transform to convert coordinates of the second coordinate system to coordinates of the first coordinate system; apply the rigid body transform to the second point cloud to generate a transformed point cloud; and generate a corrected point cloud based on the transformed point cloud.

19 Claims, 19 Drawing Sheets

(56) References Cited

U.S. PATENT DOCUMENTS

2020/0045275 A1\* 2/2020 Hsiao ...................... G06T 3/067
2021/0377501 A1\* 12/2021 Tu ........................ H04N 9/3147

\* cited by examiner

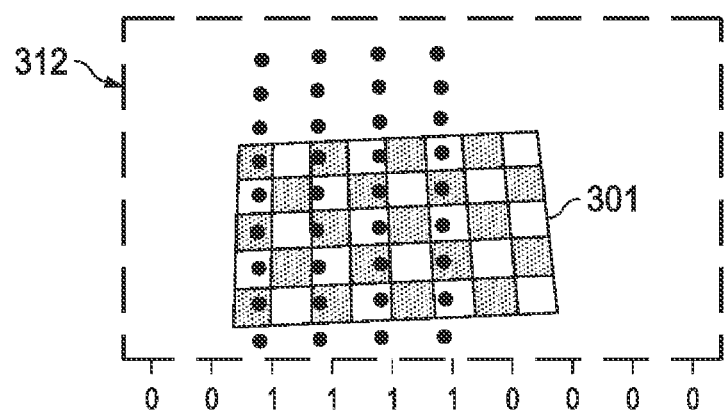
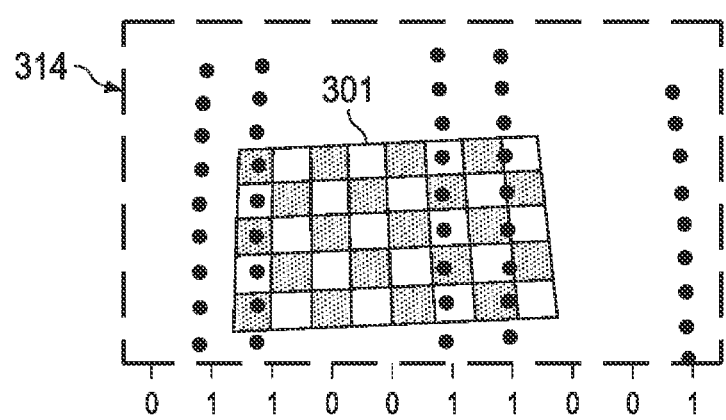

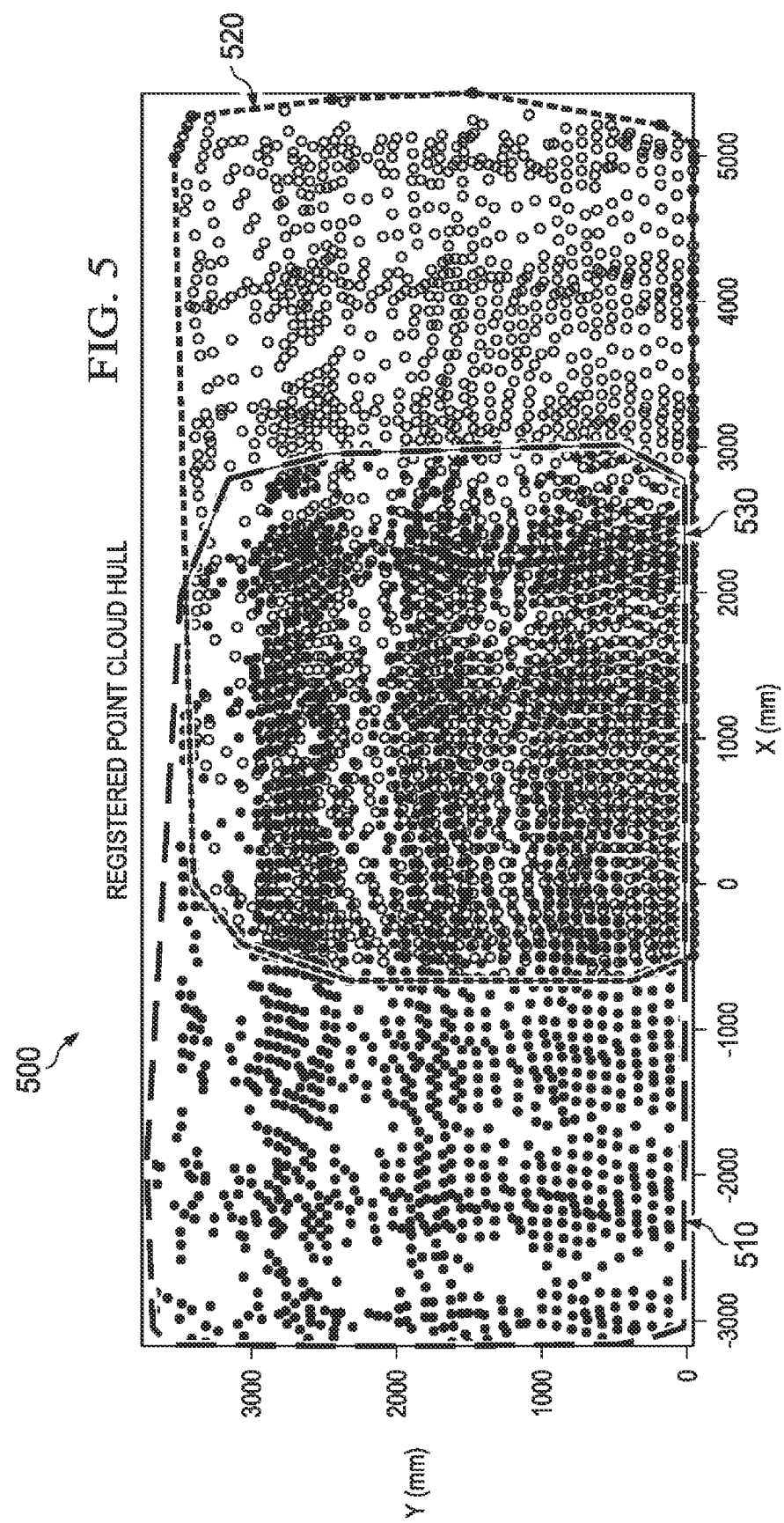

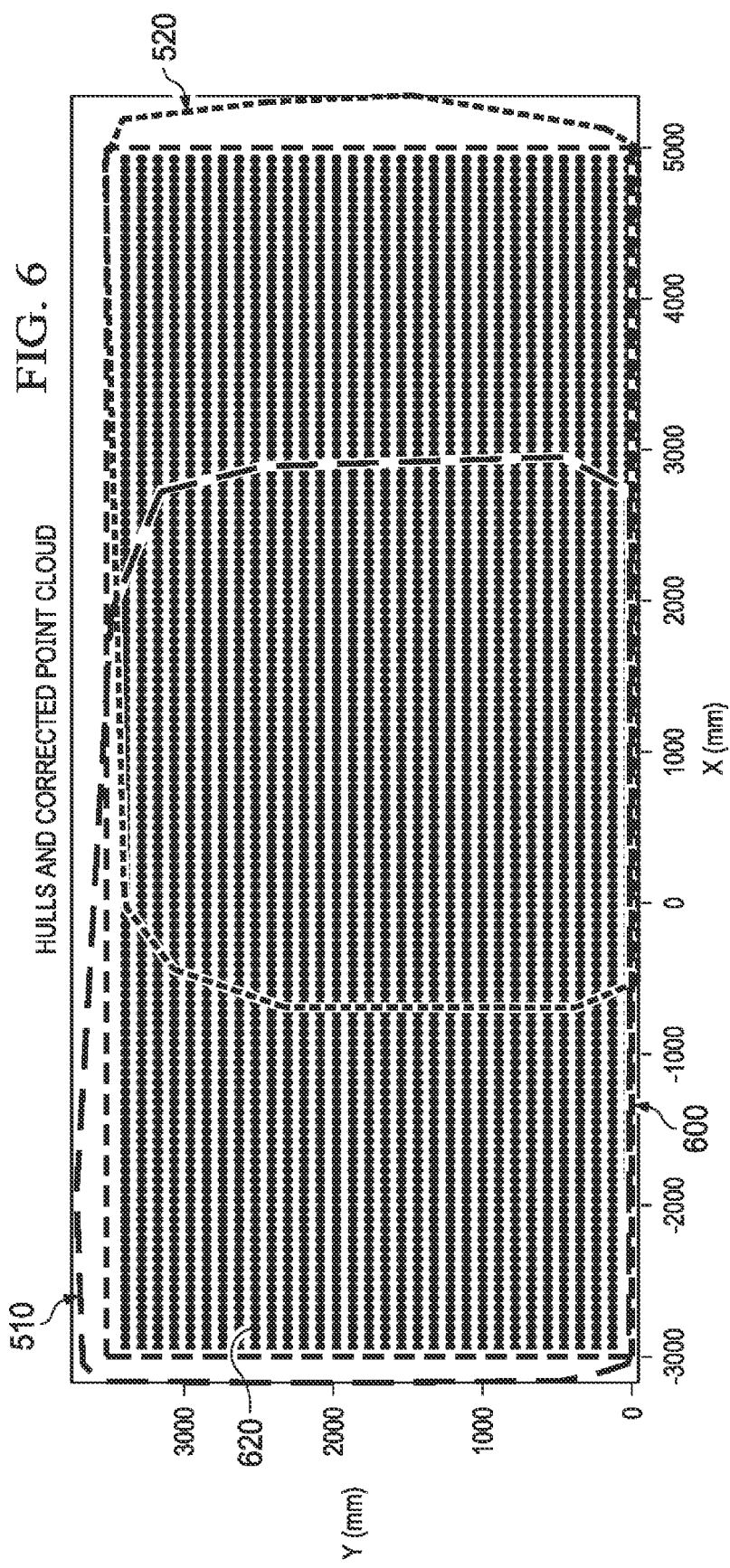

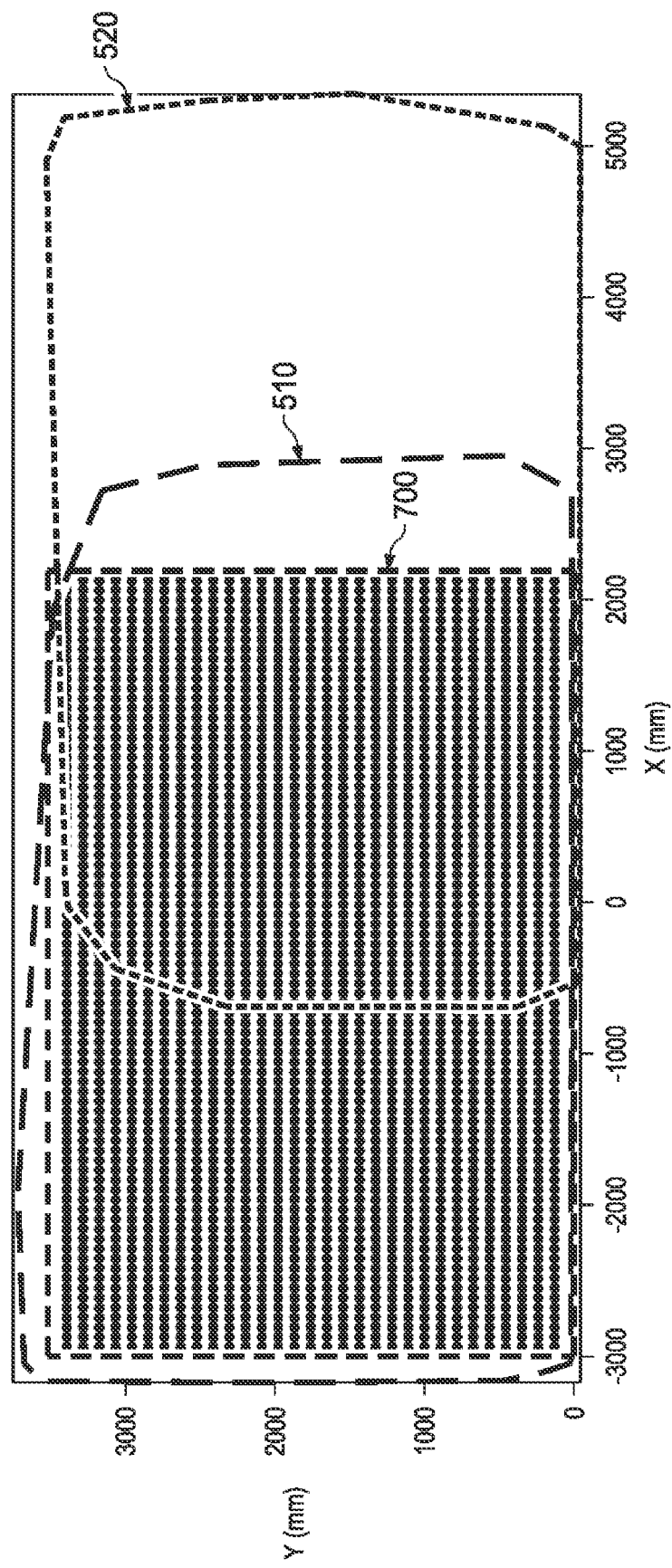

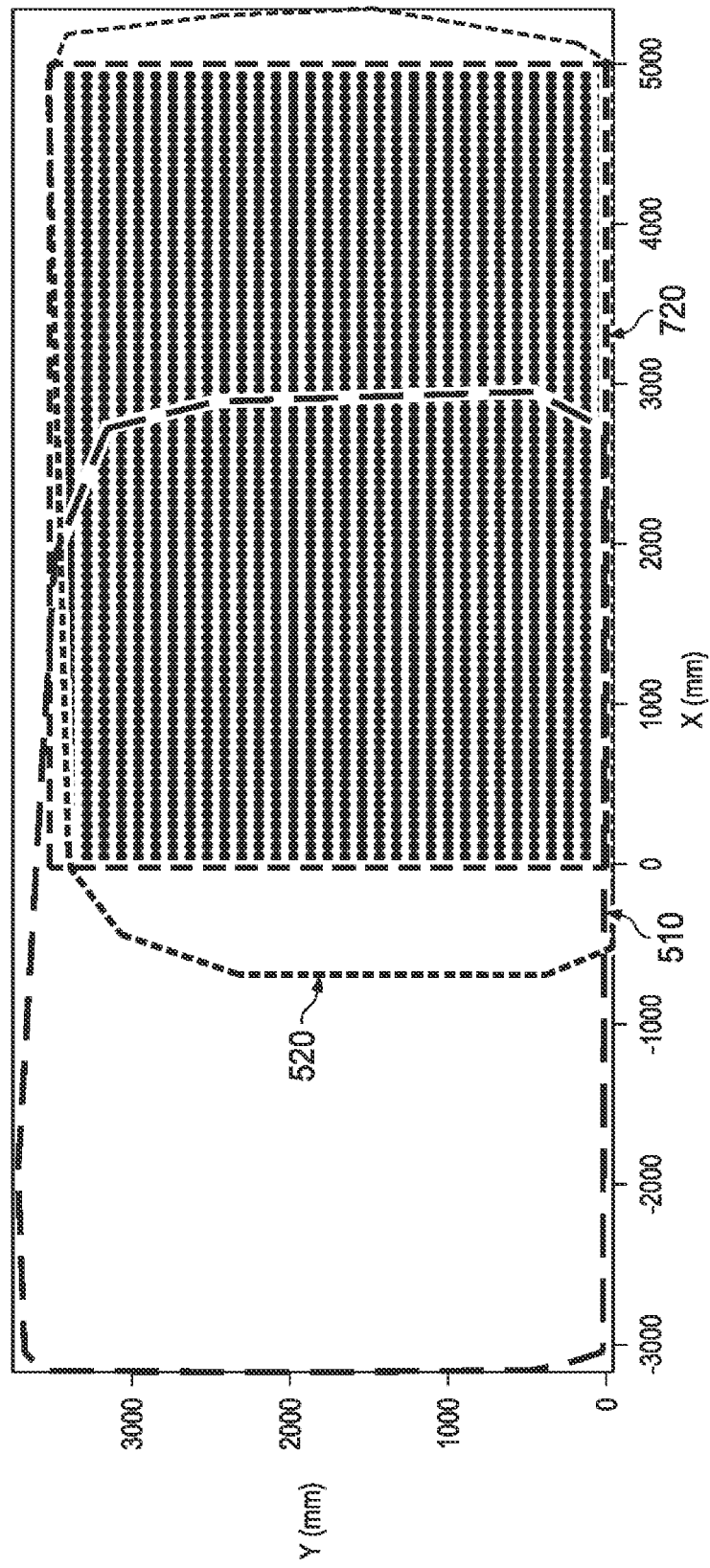

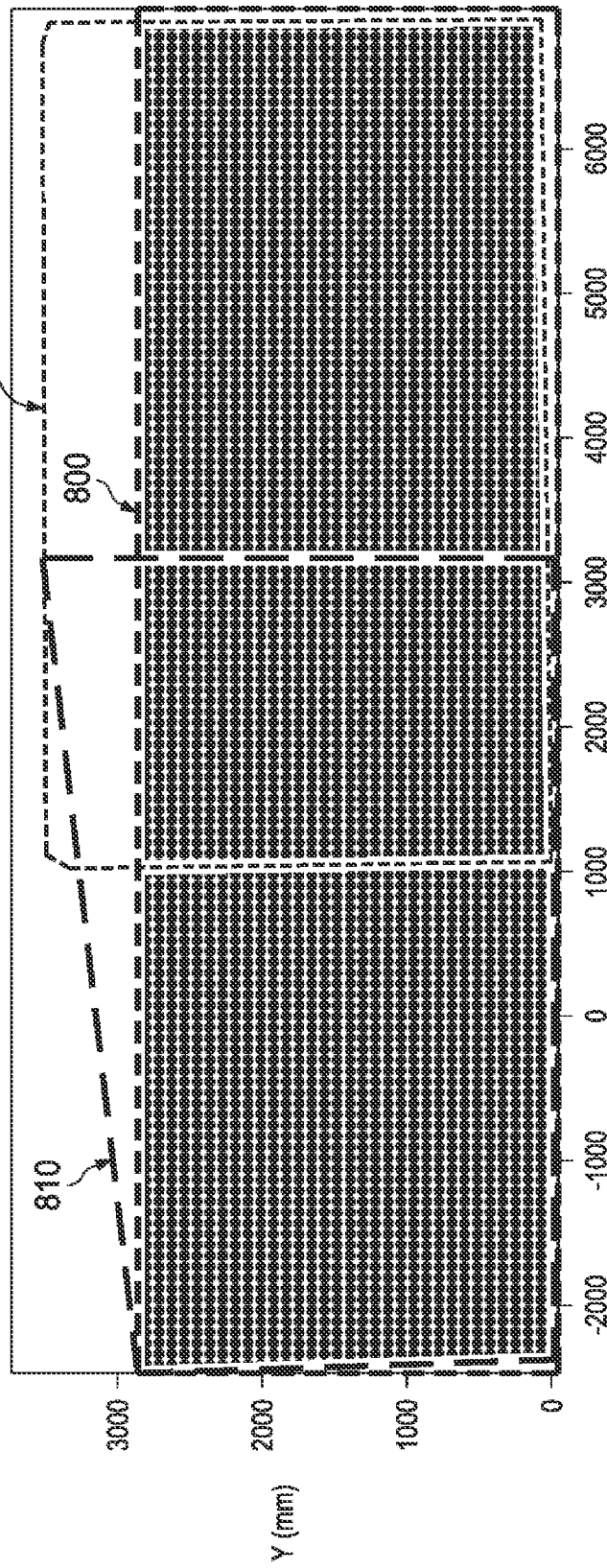

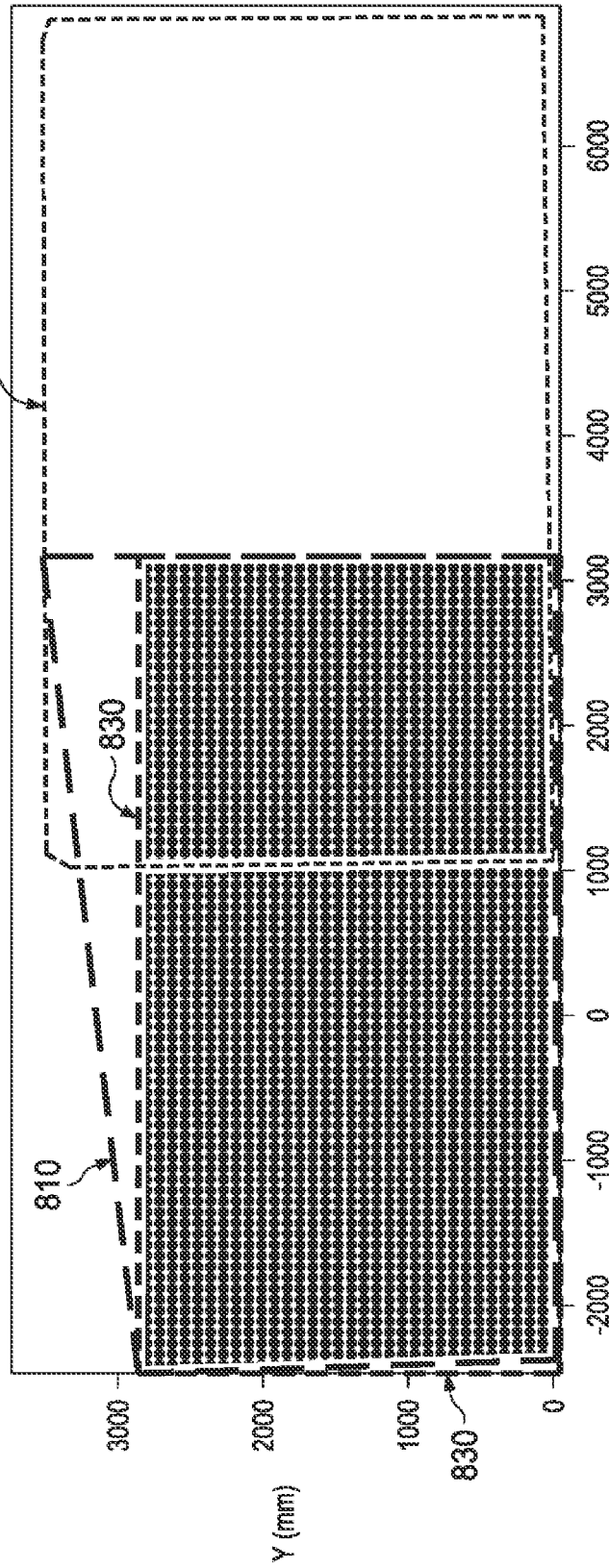

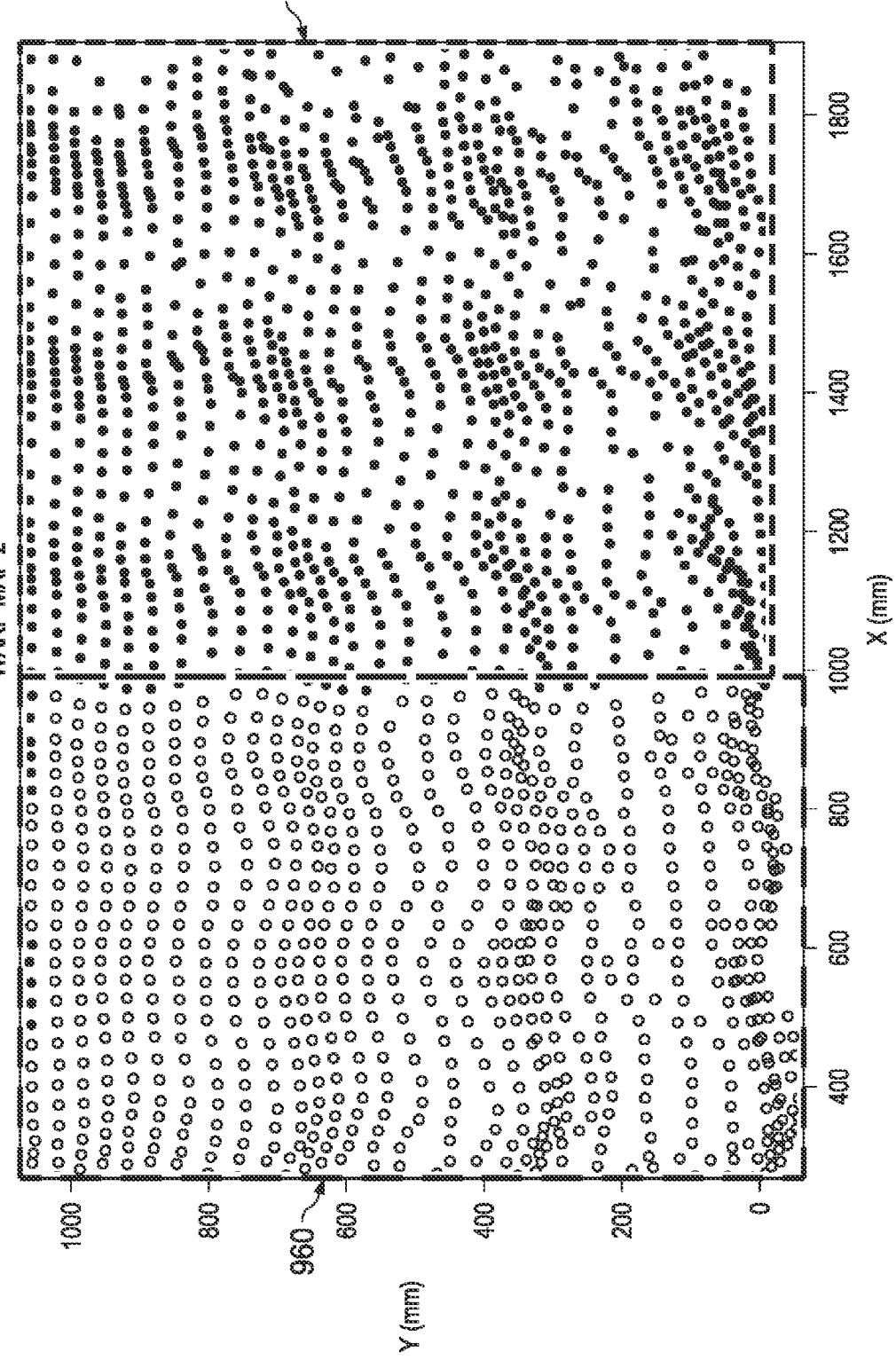

METHODS AND APPARATUS FOR CAMERA ASSISTED GEOMETRIC CORRECTION

TECHNICAL FIELD

This description relates generally to geometric correction, and more particularly to methods and apparatus for camera assisted geometric correction.

BACKGROUND

Spatial light modulators (SLM) are commonly used to accurately modify and project light, which has led SLM technologies to become a popular method of projection. Some example applications use a plurality of SLMs to project portions of an image on an arbitrary surface. In some such examples, each SLM corresponds to a portion of the image being projected, such that a combination of the SLMs project the image. Non-linear distortions of the image may result from a shape of the arbitrary surface, such that the image appears distorted. Geometric correction of the image may be applied by pre-warping the image to reduce the non-linear distortions caused by the arbitrary surface and remove misalignments caused by the position of the projector.

SUMMARY

For methods and apparatus for camera assisted geometric correction, an example apparatus includes: a controller configured to: generate a pattern of points; obtain a first image of a first reflection of a projection of the pattern of points from a first camera; generate a first point cloud having a first coordinate system based on the first image; obtain a second image of a second reflection of the projection of the pattern of points from a second camera; generate a second point cloud having a second coordinate system based on the second image; determine a rigid body transform to convert coordinates of the second coordinate system to coordinates of the first coordinate system; apply the rigid body transform to the second point cloud to generate a transformed point cloud; and generate a corrected point cloud based on the transformed point cloud.

BRIEF DESCRIPTION OF THE DRAWINGS

FIG. 3D is an illustrative example of a fourth example pattern used to generate a point cloud.

FIG. 3E is an illustrative example of a fifth example pattern used to generate a point cloud.

FIG. 5 is an illustrative example of an example point cloud hull determined as a result of the rigid body transform of FIG. 4.

FIG. 6 is an illustrative example of a corrected point cloud based on the point cloud hull of FIG. 5.

FIG. 7A is an illustrative example of a first portion of the corrected point cloud of FIG. 6 corresponding to the first projector of FIG. 1.

FIG. 7B is an illustrative example of a second portion of the corrected point cloud of FIG. 6 corresponding to the second projector of FIG. 1.

FIG. 8A is an illustrative example of a first corrected point cloud based on a first example convex polygon and a second example convex polygon.

FIG. 8B is an illustrative example of a second example corrected point cloud based on the first corrected point cloud of FIG. 8A and the first convex polygon of FIG. 8A.

FIG. 9B is an illustrative example of a second warp map corresponding to the second projector of FIG. 1.

The same reference numbers or other reference designators are used in the drawings to designate the same or similar (functionally and/or structurally) features.

DETAILED DESCRIPTION

Figure 1:
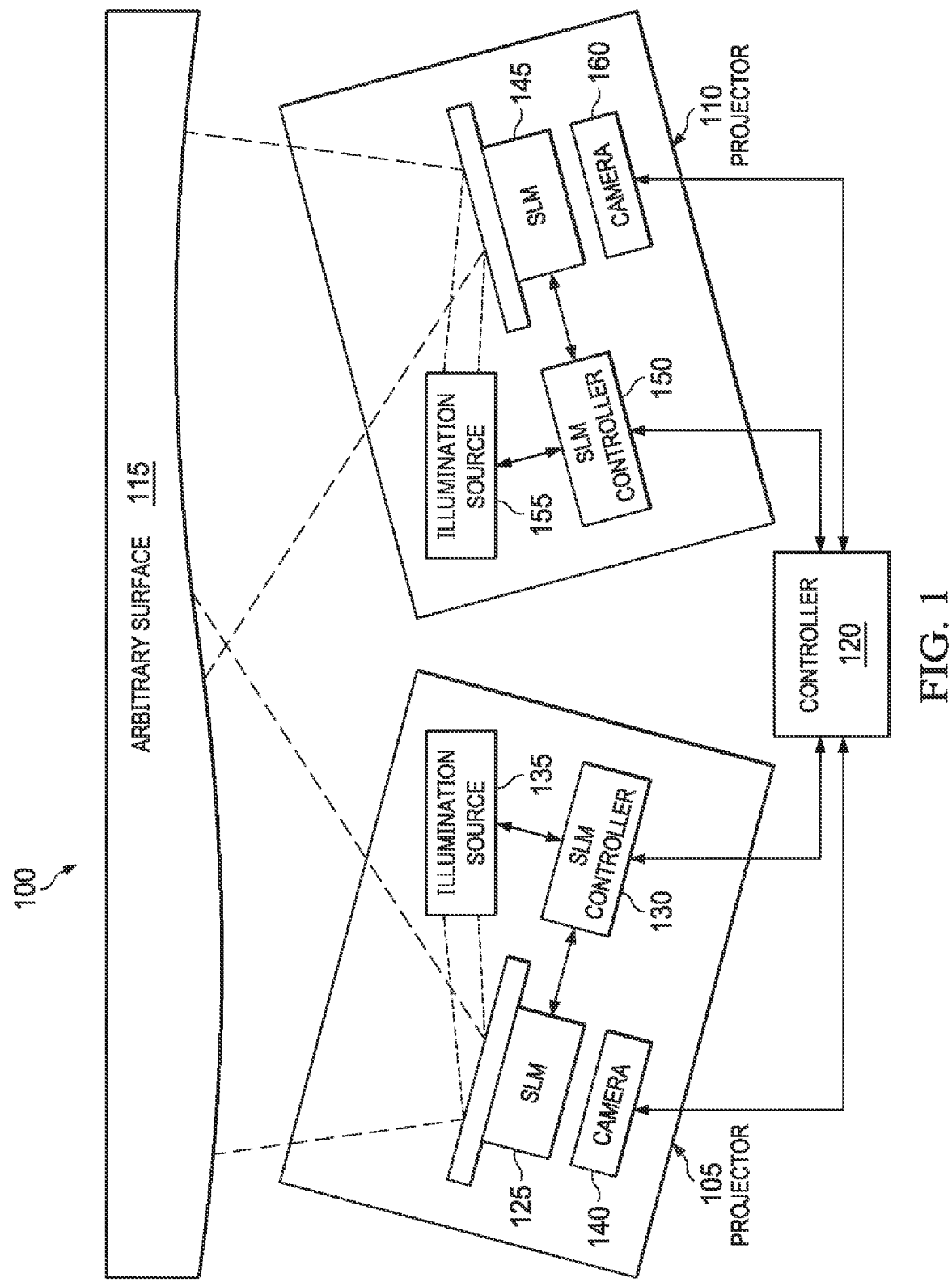
FIG. 1 is a block diagram of an example system including a first projector and a second projector configured to project onto an arbitrary surface.

The drawings are not necessarily to scale. Generally, the same reference numbers in the drawing(s) and this description refer to the same or like parts. Although the drawings show layers and regions with clean lines and boundaries, some or all of these lines and/or boundaries may be idealized. In reality, the boundaries and/or lines may be unobservable, blended and/or irregular.

Spatial light modulators (SLMs) are commonly used to accurately modify and project light, which has led SLM technologies to become a popular method of light projection. Some example applications use a plurality of SLMs to project portions of an image on an arbitrary surface. In some such examples, each SLM corresponds to a portion of the image being projected, such that a combination of the SLMs project the image. Each portion of the image being projected corresponds to a portion of the arbitrary surface in which the image is being projected onto. For example, a first SLM may project a first portion of an image on a first portion of an arbitrary object and a second SLM may project a second portion of the image on a second portion of the arbitrary, closer to the second SLM than the first portion of the arbitrary surface is to the first SLM. In some such examples, the first portion of the image may appear smaller than the second portion of the image as a result of the arbitrary surface being closer to the second SLM.

Geometric correction of light projected by a plurality of SLMs may be used as a feature of edge blending to remove non-linear distortions, caused by arbitrary surfaces and/or misalignment of SLMs, from altering the way in which the image is perceived. For example, an SLM may be configured to alter the pixel density of an image to geometrically alter a portion of the image being projected. SLMs may be optically coupled to one or more sensors to determine whether or not to use geometric correction to correct the way the portion of the image is perceived. Geometric correction may be implemented to correct image distortions caused by misalignment of the SLM in relation to a projection surface (e.g., an arbitrary surface). For example, a system configured to project an image using two SLMs may have each SLM be aligned with respect to the other SLM. In some such examples, geometric correction may be used to correct a misalignment between the two SLMs, such that the image may be accurately perceived.

Examples described herein include a method of an automatic camera assisted geometric correction for a plurality of SLMs configured to project onto an arbitrary surface. The geometric correction described herein implements cameras corresponding to each of the SLMs to determine a warp map corresponding to the arbitrary surface, such that the image may be warped to reduce non-linear distortions that result from the shape of the arbitrary surface. In some described examples, the geometric correction may be implemented to automatically correct for an arbitrary surface and/or a misalignment between optical outputs of the SLMs. The SLMs may use one or more cameras to obtain one or more images of structured light patterns being projected onto the arbitrary surface to generate a point cloud representation of the portions of the arbitrary surface that may be illuminated by the SLMs. Coordinates of points of the point cloud may be used to generate a corrected point cloud. The corrected point cloud represents a portion of the arbitrary surface, which may be illuminated by the SLMs in a manner that corrects for misalignments. For example, the corrected point cloud may be a rectangular point cloud that is configured to be perceived as a uniform grid of points as a result of being projected onto a flat uniform surface. The SLMs may obtain an image of the corrected point cloud being projected onto the arbitrary surface to generate a warp map which may be used to correct for any distortions caused by the arbitrary surface. The warp map may be used to warp content before projection, such that the image is perceived with reduced distortions.

Advantageously, the disclosed method of geometric correction may determine and/or characterize an area of the arbitrary surface in which a plurality of SLMs project the same portion of the image, such an overlap of projections may be corrected using photometric correction. Photometric correction modifies the perception of an overlapping area. The disclosed method of geometric correction increases the accuracy and reduces integration complexity of photometric correction as a result of generating accurate point cloud representations of the arbitrary surface, such that corrections to the perception of the overlapping area may be performed based on arbitrary projection surfaces.

FIG. 1 is a block diagram of an example projection system 100 including an example first projector 105 and a second projector 110 configured to project content onto an arbitrary surface 115. In the example of FIG. 1, the projection system 100 includes the first projector 105, the second projector 110, the arbitrary surface 115, and an example controller 120. The projection system 100 uses a plurality of projectors to project an image onto the arbitrary surface 115. The projection system 100 may use a plurality of cameras coupled to the controller 120 to determine whether geometric correction is required. The projection system 100 may implement geometric correction to correct a misalignment and/or distortions caused by the arbitrary surface 115, which alter the perception of the image.

In the example of FIG. 1, the first projector 105 includes an example first spatial light modulator (SLM) 125, an example first SLM controller 130, an example first illumination source 135, and an example first camera 140. The first projector 105 projects light onto the arbitrary surface 115 using the first SLM 125 to modulate light supplied by the first illumination source 135. The first projector 105 may project a first portion of an image while the second projector 110 projects a second portion of the image. For example, the projection system 100 may use the first projector 105 to project a left half of the image and the second projector 110 to project a right half of the image, such that the full image is projected onto the arbitrary surface 115.

The first SLM 125 is optically coupled to the arbitrary surface 115 and the first illumination source 135. The first SLM 125 is electrically coupled to the first SLM controller 130. The first SLM 125 modulates light supplied by the first illumination source 135, based on the first SLM controller 130, to project an image onto the arbitrary surface 115. For example, the first SLM controller 130 may set the first SLM 125 to modulate light from the first illumination source 135 to project the image on the arbitrary surface 115. In an example, the first SLM 125 may be a digital micromirror device (DMD), a liquid crystal on silicon (LCOS), a liquid crystal display (LCD), microLED, etc.

The first SLM controller 130 is electrically coupled to the controller 120, the first SLM 125, and the first illumination source 135. The first SLM controller 130 sets the first SLM 125 to modulate light supplied by the first illumination source 135, such that the first SLM 125 projects an image on the arbitrary surface. For example, the first SLM controller 130 may load values into the first SLM 125 during a duration in which a first image is being projected, such that the loaded values may be latched into the first SLM 125 to project a second image immediately following the first image. In the example of FIG. 1, the first SLM controller 130 is illustrated separately from the controller 120. Alternatively, the first SLM controller 130 may be included in the controller 120. The first SLM controller 130 may be processing circuitry, a field programmable gate array (FPGA), application specific integrated circuitry (ASIC), etc.

The first illumination source 135 is optically coupled to the first SLM 125. The first illumination source 135 is electrically coupled to the first SLM controller 130. The first illumination source 135 generates light to be modulated by the first SLM 125 based on an electrical input from the first SLM controller 130. The first illumination source 135 may generate a plurality of different optical outputs based on the first SLM controller 130. For example, the first SLM 125 may project an image in color as a result of the first illumination source 135 generating a red light, a green light, and/or a blue light, or by generating white light.

The first camera 140 is electrically coupled to the controller 120. Alternatively, the first camera 140 may be electrically coupled to the first SLM controller 130. The first camera 140 is optically coupled to the arbitrary surface 115. The first camera 140 captures images of the arbitrary surface 115 representative of a perception of the arbitrary surface 115 from the location of the first SLM 125. The controller 120 may obtain the image captured by the first camera 140 to determine whether geometric correction will be implemented based on the image perceived by the first camera 140. For example, the first SLM 125 may project a Gaussian structured light pattern to enable the first camera 140 to obtain an image which allows the controller 120 to generate a point cloud corresponding to the arbitrary surface 115. In the example of FIG. 1, the first camera 140 is illustrated behind the projector for illustrative simplicity of illustration, but in practice the first camera 140 has an unobstructed view of the arbitrary surface 115. Alternatively, the first camera 140 may be mounted to an alternate location within the first projector 105, such as on top of, next to, or under the first SLM 125.

In the example of FIG. 1, the second projector 110 includes a second SLM 145, a second SLM controller 150, a second illumination source 155, and a second camera 160. The second projector 110 is similar to the first projector 105. The second projector 110 projects light onto the arbitrary surface 115 using the second SLM 145 to modulate light supplied by the second illumination source 155. The second projector 110 may project a second portion of an image while the first projector 105 projects a first portion of the image. For example, the projection system 100 may use the first projector 105 to project a left half of the image and the second projector 110 to project a right half of the image, such that the full image is projected onto the arbitrary surface 115.

In the example of FIG. 1, the second SLM 145 modulates light corresponding to a second portion of the image being projected on the arbitrary surface 115 by the projectors 105 and 110. The second SLM controller 150 controls the second SLM 145 based on the controller 120. The second illumination source 155 illuminates the second SLM 145 based on the second SLM controller 150. The second camera 160 obtains an image of the perceived image projected on the arbitrary surface 115 as seen by the second projector 110.

In example operation, the controller 120 determines a left portion of an image and a right portion of the image based on the portions of the arbitrary surface 115 corresponding to each of the projectors 105 and 110. The SLM controllers 130 and 150 configure the SLMs 125 and 145 and the illumination sources 135 and 155 to project the portions of the image onto the arbitrary surface 115. For example, the first SLM controller 130 may load data corresponding to the left portion of the image into the first SLM 125, such that the first SLM 125 projects the left portion of the image as a result of latching the loaded data.

In example operation, the cameras 140 and 160 may obtain one or more images of the arbitrary surface 115 to determine whether to implement geometric correction. For example, the controller 120 may implement geometric correction as a result of the cameras 140 and 160 perceiving the right portion of the image is proportionally smaller than the left portion of the image. In such an example, the controller 120 may determine to implement geometric correction as a result of determining non-linear distortions and/or misalignments of the image being projected, such that misalignments arising from relative positions may be determined. The controller 120 may project a series of Gaussian structured light patterns to accurately determine a plurality of points of the arbitrary surface 115 which may be corrected as a result of implementing geometric correction to warp the image, such that the image may be perceived with reduced non-linear distortions. The cameras 140 and 160 may capture images of the series of Gaussian structured light patterns being projected onto the arbitrary surface 115 to determine a warp map corresponding to the shape of the arbitrary surface 115. The controller 120 may geometrically correct the output of the projectors 105 and 110 based on the warp map. The controller 120 may determine whether geometric correction may be implemented as a result of determining the alignment between projectors 105 and 110 has changed. Advantageously, the projection system 100 may determine whether to implement geometric correction using the cameras 140 and 160 to capture the perceived image projected on the arbitrary surface 115.

Figure 2:
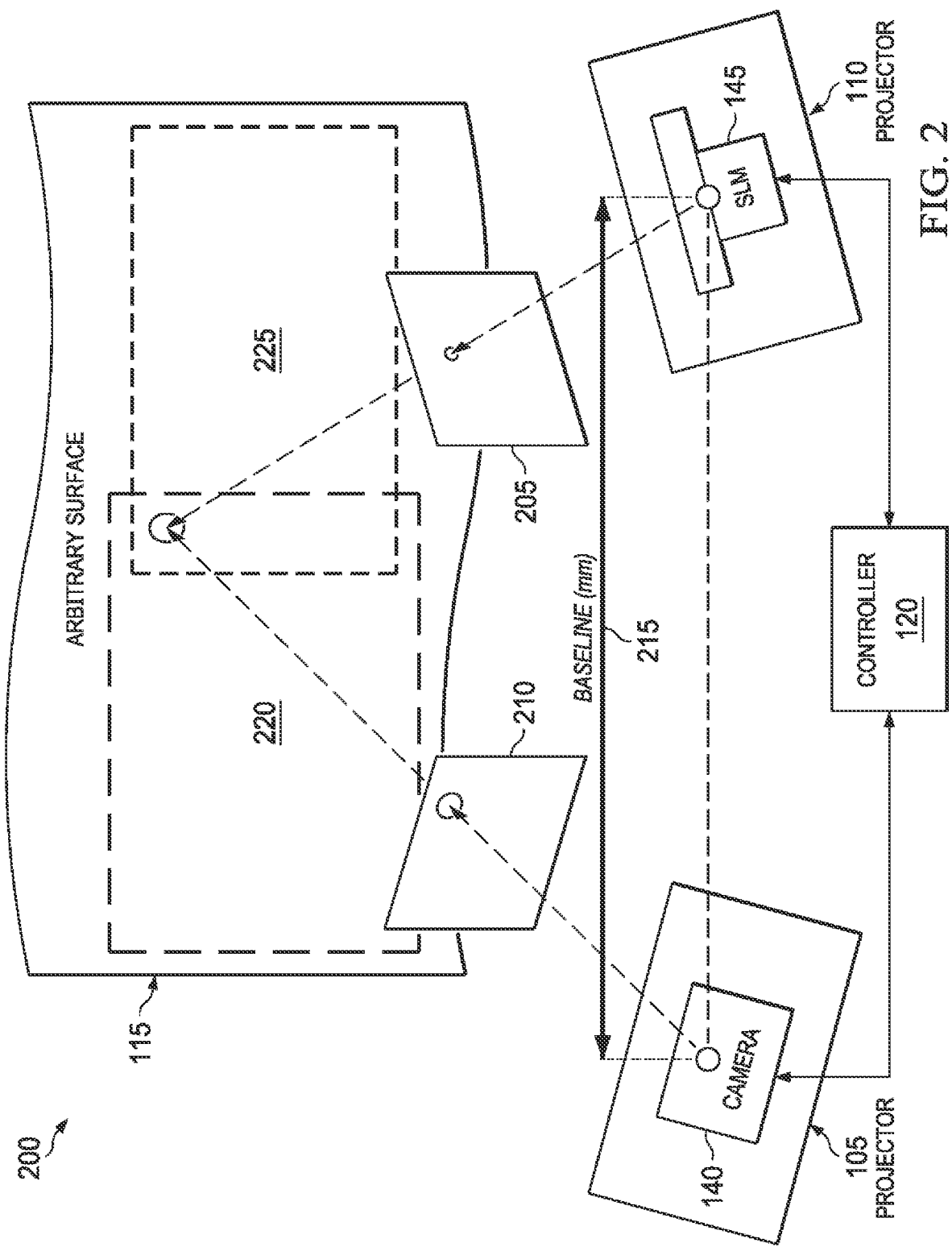
FIG. 2 is an isometric view of the system of FIG. 1 including an illustrative representation of an example SLM optical output and an example camera optical input.

FIG. 2 is an isometric view 200 of the projection system 100 of FIG. 1 including an illustrative representation of an example SLM optical output 205 and an example camera optical input 210. In the example of FIG. 2, the isometric view 200 illustrates the projection system 100, the SLM optical output 205, the camera optical input 210, an example baseline 215, an example left portion 220, and an example right portion 225. The isometric view 200 illustrates the perceived output of an SLM included in the projectors 105 and 110 of FIG. 1 (e.g., the SLMs 125 and 145). The isometric view 200 illustrates the perceived input of a camera included in the projectors 105 and 110 (e.g., the cameras 140 and 160 of FIG. 1). In the example of FIG. 2, the isometric view 200 illustrates the interaction between cameras and SLMs included in projectors for use in geometric correction.

In the example of FIG. 2, the SLM optical output 205 is an example illustration of an image plane representative of potential locations of pixels that may be controlled by the second SLM 145. For example, the SLM optical output 205 represents the geometrical area that the second SLM 145 may illuminate. In some such examples, the SLM optical output 205 may be modified based on the second SLM 145, such that the SLM optical output 205 corresponds to the image plane of the SLM 145. Advantageously, the SLM optical output 205 is independent of the shape of the arbitrary surface 115.

The camera optical input 210 is an example illustration of a plane representative of the potential locations that pixels may be found by the first camera 140. For example, the camera optical input 210 represents potential geometric locations of light supplied by the first projector 105. In some such examples, the camera optical input 210 may represent geometric locations of light supplied by both the first projector 105 and the second projector 110.

The baseline 215 is a distance between a center point of the first projector 105 and a center point of the second projector 110. The baseline 215 may be used by the controller 120 to determine an alignment of the projectors 105 and 110 in relation to each other. A change in the baseline 215 may indicate that a change in the alignment of the projectors 105 and 110 has occurred, such that geometric correction may be performed to account for a modified baseline.

The left portion 220 illustrates the portion of the arbitrary surface 115 in which the first projector 105 illuminates with the left portion 220 of an image. The left portion 220 includes a geometric shape of the arbitrary surface 115. The geometric shape of the left portion 220 is based on a shape of the arbitrary surface 115, the distance between the first projector 105 and the arbitrary surface 115, etc. For example, the geometric area of the left portion 220 increases as the distance between the first projector 105 and the arbitrary surface 115 is increased. In some such examples, a length of the left portion 220 increases as the first projector 105 is rotated.

The right portion 225 illustrates the portion of the arbitrary surface 115 in which the second projector 110 illuminates with the right portion 225 of the image. Advantageously, the geometric shape of each of the portions 220 and 225 may be determined from obtained images using the cameras 140 and 160.

In example operation, the controller 120 may determine the geometric shapes of the portions 220 and 225 based on images captured by the cameras 140 and 160. The controller 120 may use the SLM optical output 205 and the camera optical input 210 to generate the baseline 215. The baseline 215 may be used to determine a geometric shape corresponding to the left portion 220, the right portion 225, and an area shared between both portions 220 and 225. Advantageously, the projection system 100 may use a combination of one or more SLMs and cameras to determine the geometric areas corresponding to the portions 220 and 225.

Figure 3A:
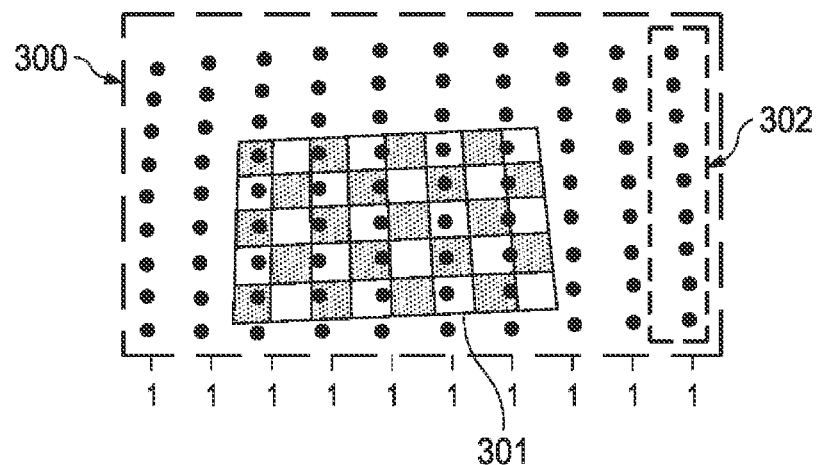
FIG. 3A is an illustrative example of a first example pattern used to generate a point cloud.

FIG. 3A is an illustrative example of a first example Gaussian structured light pattern 300 used to generate a point cloud. The first Gaussian structured light pattern 300 is a gray encoded pattern. An example grid 301 is an image that may be projected by the projectors 105 or 110 to illustrate an application in which geometric correction may be used to correct for perception issues resulting from a distortion of the arbitrary surface 115 or a rotation of the projector 105 or 110. For example, the controller 120 of FIG. 1 may determine that geometric correction is required as a result of an image from the first camera 140 during a duration in which the first SLM 125 is projecting the grid 301. In the example of FIG. 3A, the first Gaussian structured light pattern 300 includes ten columns, such as an example column 302. Alternatively, the Gaussian structured light pattern 300 may include any number of points and/or number of columns, such that a sampling resolution increases as the number of points and the number of columns increases. The sampling resolution corresponds to a temporal encoding of elements, which may be used to establish a correspondence between a camera and projector coordinate systems.

The first Gaussian structured light pattern 300 is projected onto an arbitrary surface (e.g., the arbitrary surface 115 of FIG. 1) to generate a visible grid of points that may be perceived by a camera (e.g., the cameras 140 and 160 of FIG. 1). The camera may capture an image of the arbitrary surface as a result of an SLM (e.g., the SLMs 125 and 145) projecting the first Gaussian structured light pattern 300 on the arbitrary surface. A controller (e.g., the controller 120 of FIGS. 1 and 2) may be configured to detect columns of points (e.g., the column 302) to generate a point cloud based on the perception of the first Gaussian structured light pattern 300. Alternatively, the controller may be configured to detect individual points, rows, grids, etc.

In the example of FIG. 3A, the controller assigns bit values to the columns indicating whether the column contains structured light patterns. The controller may assign a portion of an image to a digital one ("1") as a result of determining the column contains visible points which may be perceived in a portion of the projected image for that column. For example, the column 302 may be represented as a digital one as a result of determining points projected as a portion of the first Gaussian structured light pattern 300 are within the first column. Alternatively, the controller may assign a portion of an image to a digital zero ("0") as a result of determining the column does not contain visible points. For example, the controller may determine that the first Gaussian structured light pattern 300 may be represented as ten columns of dots, such that the controller may represent the first Gaussian structured light pattern 300 with ten digital ones. Alternatively, the controller may assign any portion of a projected pattern a digital one or zero, such as based on rows of points opposed to columns of points.

Figure 3B:
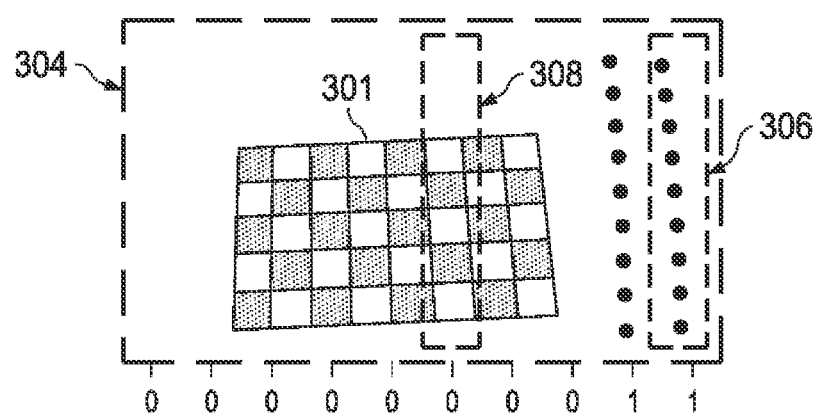
FIG. 3B is an illustrative example of a second example pattern used to generate a point cloud.

FIG. 3B is an illustrative example of a second example Gaussian structured light pattern 304 used to generate a point cloud. In the example of FIG. 3B, the second Gaussian structured light pattern 304 includes ten columns, such as a first example column 306 and a second example column 308. The second Gaussian structured light pattern 304 is projected on an arbitrary surface (e.g., the arbitrary surface 115 of FIG. 1) to generate a visible grid of points that may be perceived by a camera (e.g., the cameras 140 and 160 of FIG. 1). The camera may capture an image of the arbitrary surface as a result of an SLM (e.g., the SLMs 125 and 145) projecting the second Gaussian structured light pattern 304 on the arbitrary surface. A controller may be configured to detect columns of points (e.g., the columns 306 and 308) to generate a point cloud based on the perception of the second Gaussian structured light pattern 304. Alternatively, the controller may be configured to detect individual points, rows, grids, etc.

In the example of FIG. 3B, the controller assigns bit values to the columns indicating whether the column contains structured light patterns. The controller may assign a portion of an image to a digital one ("1") as a result of determining the column contains visible points which may be perceived in a portion of the projected image. The controller may assign a portion of an image to a digital zero ("0") as a result of determining the column does not contain visible points. For example, the first column 306 may be represented as a digital one as a result of determining points projected as a portion of the second Gaussian structured light pattern 304 are within the first column 306. In some such example, the second column 308 may be represented as a digital zero as a result of determining there are no visible points in the portion of the second Gaussian structured light pattern 304 that corresponds to the second column 308. Alternatively, the controller may assign a portion of an image to a digital one as a result of determining there are no visible points and a digital zero as a result of determining the presence of visible points. In the example of FIG. 3B, the second Gaussian structured light pattern 304 may be represented as eight digital zeros followed by two digital ones.

Figure 3C:
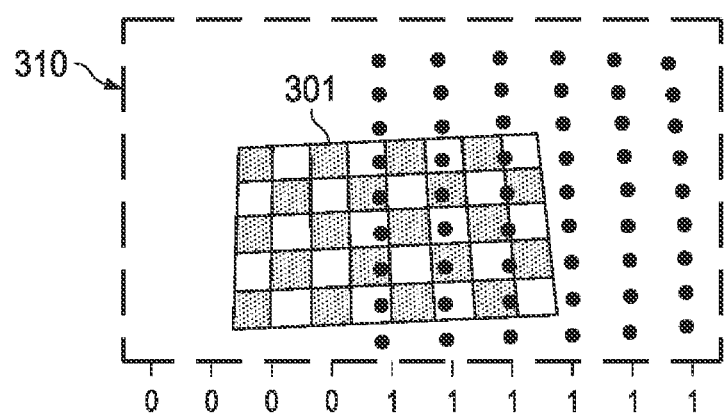
FIG. 3C is an illustrative example of a third example pattern used to generate a point cloud.

FIG. 3C is an illustrative example of a third example Gaussian structured light pattern 310 used to generate a point cloud. The third Gaussian structured light pattern 310 may be represented as four digital zeros followed by six digital ones. Advantageously, the Gaussian structured light patterns 300, 304, and 310 may be represented by a different set of ten digits corresponding to ten columns, such that there are two to the power of ten potential structured light patterns.

FIG. 3D is an illustrative example of a fourth example Gaussian structured light pattern 312 used to generate a point cloud. The fourth Gaussian structured light pattern 312 may be represented as two digital zeros followed by four digital ones and four digital zeros. Advantageously, the Gaussian structured light patterns 300, 304, 310, and 312 may be represented by a different set of ten digits corresponding to ten columns, such that there are two to the power of ten potential structured light patterns.

FIG. 3E is an illustrative example of a fifth example Gaussian structured light pattern 314 used to generate a point cloud. The fifth Gaussian structured light pattern 314 may be represented as one digital zero followed by two digital ones, two digital zeros, two digital ones, two digital zeros, and then a digital one. Advantageously, the Gaussian structured light patterns 300, 304, 310, 312, and 314 may be represented by a different set of ten digits corresponding to ten columns, such that there are two to the power of ten potential structured light patterns.

In the example of FIGS. 3A-3E, the Gaussian structured light patterns 300, 304, 310, 312, and 314 are example gray encoded structured light patterns that may be used by a projection system (e.g., the projection system 100 of FIG. 1) to generate a point cloud based on the way structured light patterns are perceived. A controller may use triangulation between the projection of the Gaussian structured light patterns 300, 304, 310, 312, and 314 and the images captured by a camera, the captured images corresponding to respective structured light patterns. For example, the controller 120 of FIG. 1 generates a point cloud representation of the Gaussian structured light patterns 300, 304, 310, 312, and 314 as a result of using triangulation to determine three-dimensional coordinates for points of the point cloud. The triangulation of coordinates may be a result of comparing coordinates of points in a first image to coordinates of a point in another image. Advantageously, the projection system 100 uses a plurality of Gaussian structured light patterns (e.g., the Gaussian structured light patterns 300, 304, 310, 312, and 314) to transform all of the points being projected by the projection system 100 to coordinate systems of the cameras 140 and 160. Advantageously, a plurality of structured light patterns being projected on an arbitrary surface combined with a plurality of images illustrating the perception of each pattern to generate a point cloud representative of the arbitrary surface. Advantageously, the controller generates a point cloud of a reference coordinate system using triangulation between the points of the pattern in captured images and the coordinates of the points when being projected by the projection system 100.

In the example of the projection system 100, each structured light pattern may be captured by both of the cameras 140 and 160 of FIG. 1. For example, the projection system 100 may determine coordinates representative of a centroid of a combination of individual points by performing single connected component analysis on images captured by both cameras 140 and 160 of the same structured light patterns. In some such examples, temporal encoding may be used to establish a correspondence between projector and camera co-ordinate systems. The projection system 100 may determine the number of structured light patterns to accurately establish a correspondence between coordinate systems using Equation (1), below, where an x-axis resolution ($X_{Res}$) and a y-axis resolution ($Y_{Res}$) are used to determine the minimum number of patters ($N_{min}$). The correspondence between coordinate systems may be established as a result of determining coordinates of centroids of the points of the structured light patterns generated by the controller 120.

$$N_{min}=1+\log_2 X_{Res}+\log_2 Y_{Res},\qquad \text{Equation (1)}$$

Advantageously, the plurality of projectors included in the projection system 100 enable the controller 120 to generate a three-dimensional (3D) co-ordinate system representative of the arbitrary surface based on a plurality of images captured across a plurality of structured light patterns being projected onto the arbitrary surface.

Figure 4:
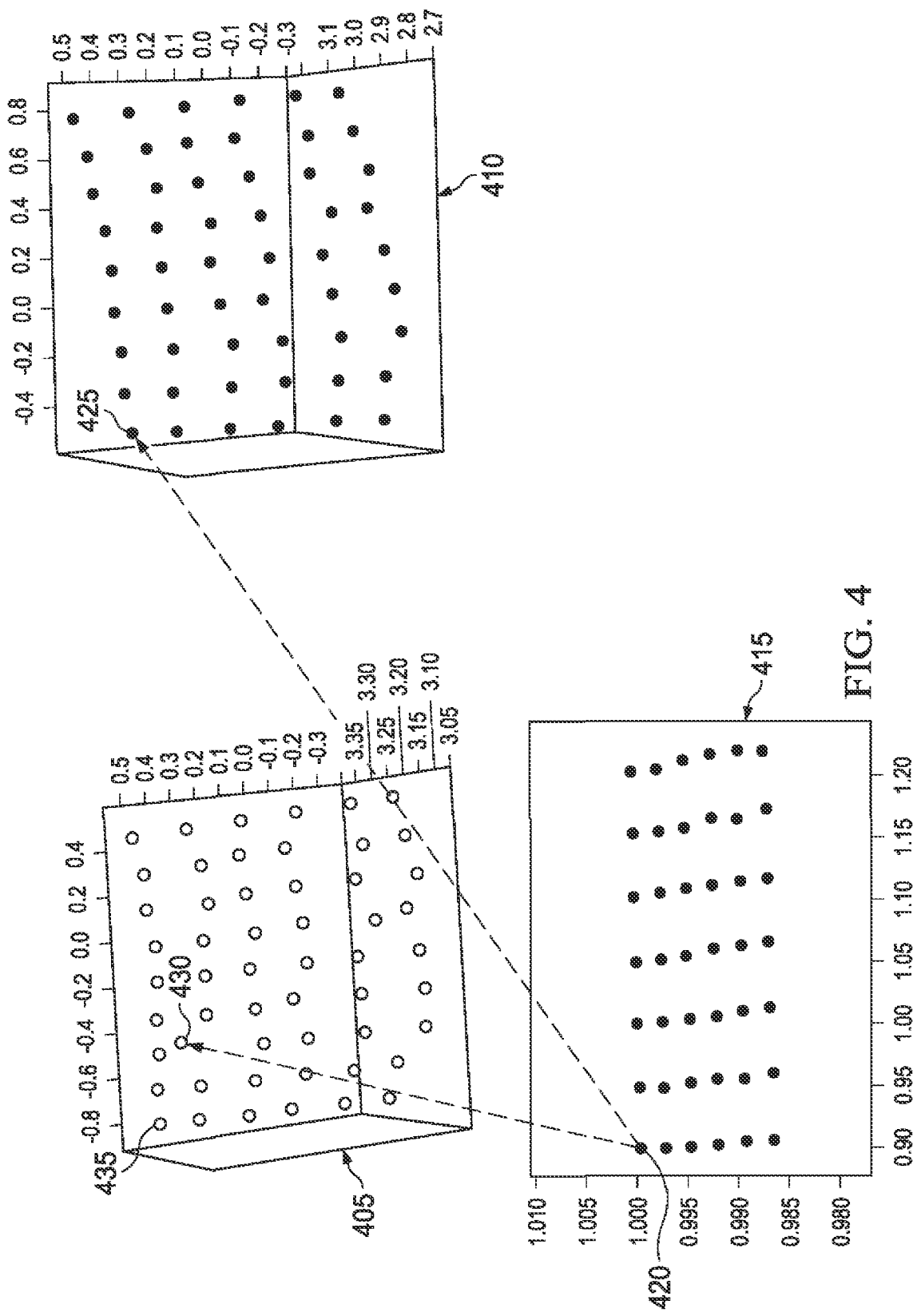
FIG. 4 is an illustrative example of an example rigid body transform between a first example frame of reference and a second example frame of reference generated by structured light patterns such as the structured light patterns of FIGS. 3A-3E.

FIG. 4 is an illustrative example of an example cross capture used to determine a rigid body transform between a first example frame of reference 405 corresponding to the first projector 105 of FIG. 1 and a second example frame of reference 410 corresponding to the second projector 110 of FIG. 1. Cross capture uses a plurality of cameras to capture an image of a pattern being projected onto a surface to generate two or more sets of three-dimensional points, which represent the projection of the pattern. The generated sets of three-dimensional points correspond to a coordinate system of the camera used to capture the pattern. For example, the controller 120 of FIG. 1 may determine a first set of points in a first coordinate system corresponding to an image captured by the first camera 140 of FIG. 1 and a second set of points in a second coordinate system corresponding to the second camera 160 of FIG. 1. Cross capture may be used by the projection system 100 of FIG. 1 to determine a rigid body transformation, which uses the knowledge that the sets of points both represent the same pattern, to convert points between the coordinate systems of the cameras 140 and 160. Advantageously, the rigid body transform, determined using cross capture, reduces the integration complexity of geometric correction as a result of correcting distortions in a singular coordinate system.

In the example of FIG. 4, the illustration of the cross capture that may be performed by the projection system 100 includes the first frame of reference 405, the second frame of reference 410, and an example overlap point cloud 415. A rigid body transform resulting from the cross capture illustrated by the frames of reference 405 and 410 converts the coordinates of the points in a non-reference coordinate system to coordinates in a reference coordinate system. The rigid body transform represents a calculation to convert coordinates of points represented in the non-reference coordinate system to coordinates in the reference system and/or vice versa. For example, the rigid body transform may be applied to a right portion of an image to convert the coordinates from the reference coordinate system to the non-reference coordinate system.

In the example of FIG. 4, the first frame of reference 405 is a three-dimensional point cloud representative of coordinates of points of a point cloud in a first co-ordinate system corresponding to the first projector 105 (x1, y1, z1). The points of the first frame of reference 405 may be determined from obtained images as a result of using the cameras 140 and 160 to capture one or more gray encoded structured light patterns (e.g., the Gaussian structured light patterns 300, 304, 310, and/or 312 of FIG. 3A-3E). For example, the first frame of reference 405 may represent the first Gaussian structured light pattern 300 as captured by the first camera 140 as a result of the first projector 105 projecting the first Gaussian structured light pattern 300 on the arbitrary surface 115 of FIG. 1. In such an example, the first camera 140 may capture the optical output of the first projector 105 to determine a three-dimensional location of each point of the first Gaussian structured light pattern 300, such that the coordinates of the first frame of reference 405 correspond to the coordinate system of the first projector 105. Advantageously, points of the first frame of reference 405 may be transformed using the rigid body transform into points of the reference coordinate system.

The second frame of reference 410 is a three-dimensional point cloud representative of geometric co-ordinates of points of a point cloud in a second co-ordinate system corresponding to the second projector 110 (x2, y2, z2). The points of the second frame of reference 410 may be determined as a result of using the second camera 160 to capture one or more gray encoded structured light patterns (the Gaussian structured light patterns 300, 304, 310, and/or 312) being projected by the first projector 105. For example, the second camera 160 may cross capture the first Gaussian structured light pattern 300 being projected by the first projector 105 to determine three-dimensional co-ordinates of the points of the first Gaussian structured light pattern 300. The co-ordinate system used to generate the three-dimensional location of each point in the second frame of reference 410 may differ from the co-ordinate system used for the first frame of reference 405.

In the example of FIG. 4, the three-dimensional coordinates of points of the point clouds of the frames of reference 405 and 410 are determined based on the coordinates of the points as captured. For example, an image, captured by the first camera 140, of the Gaussian structured light pattern 300, represents the points of the Gaussian structured light pattern 300 as two-dimensional coordinates. In such an example, the controller 120 may assign a three-dimensional coordinate to represent the captured two-dimensional coordinates as a result mapping the two-dimension coordinates onto a three-dimensional projection. The coordinates captured by one of the cameras 140 or 160 may be mapped onto a three-dimensional projection as a result of adding a z-axis value and correcting for any distortions (e.g., tangential, radial, etc.) resulting from the camera. For example, the controller 120 may transform the two-dimensional coordinates to three-dimensional coordinates as a result of adding a z-axis coordinate with a value of one. In such an example the controller 120 may complete mapping as a result of modifying the two-dimensional coordinates to account for a focal point and/or principal point of the camera 140.

Mapping the captured two-dimensional coordinates onto a three-dimensional projection may be performed using captured two-dimensional points ([u, v]), a camera focal point ([$f_x$, $f_y$]), and a camera principal point ([$p_x$, $p_y$]). The captured two-dimensional points are the x-axis and y-axis coordinates of points in an image captured by a camera (e.g., the cameras 140 and 160). The captured two-dimensional points may be transformed to a three-dimensional value by adding a z-axis value equal to a preset value. The camera focal point is an x-axis and y-axis coordinate of a focal point of the camera used to capture the image. The camera focal point may be referred to as a pinhole camera which capture images as a result of a reflection of light through a pinhole, such that the focal point of the camera is determined based on the pin hole of the camera used. The camera principal point is an x-axis and y-axis coordinate of the point where the image plane and optical axis intersect. The camera principal point in a pinhole camera is approximately the center of the image, such that a ray perpendicular to image plane at the principal point intersects with the pinhole. The two-dimensional coordinates determined from an image may be mapped to a three-dimensional projection (x) using Equation (2), below, where the captured two-dimensional points are offset by coordinates of the principal point and divided by the respective focal point lengths. Advantageously, the controller 120 may use Equation (2), below, to map two-dimensional coordinates, generated using an image obtained from the camera 140 or 160, into a three-dimensional projection based on the camera focal point and principal point.

$$x \mapsto \left[ \frac{(u - p_x)}{f_x}, \frac{(v - p_y)}{f_y}, 1 \right],  \quad \text{Equation (2)}$$

The overlap point cloud 415 is an illustrative example of the spatial light pattern from the frames of reference 405 and 410 in a two-dimensional coordinate system on the image plane (e.g., the image plane illustrated as the SLM optical output 205 of FIG. 2), such that the frames of reference 405 and 410 represent the points in the coordinate systems of the cameras 140 and 160, respectively. The overlap point cloud 415 may be one of the Gaussian structured light patterns 300, 304, 310, 312, and 314 of FIGS. 3A-3E as they would be projected onto the image plane of one of the projectors 105 or 110. The overlap point cloud 415 is the spatial light pattern captured by both of the cameras 140 and 160, such that the coordinates of the points of the frames of reference 405 and 410 correspond to the same pattern. Advantageously, the points of the frames of reference 405 and 410 may be determined to correspond to the same point in the overlap point cloud 415, such that correspondence between the frames of reference 405 and 410 may be established. Advantageously, the frames of reference 405 and 410 transform two-dimensional coordinates of the overlap point cloud 415 into three-dimensional coordinates, which include a depth coordinate.

In the example of FIG. 4, the three-dimensional projection generated as a result of using Equation (2), above, may be converted into a projector space as a result of normalizing the mapped three-dimensional projection coordinates and rotating the coordinates into the corresponding projector coordinate system. The three-dimensional projection may be normalized as a result of dividing the coordinates determined using Equation (2), above, by the magnitude of the coordinate, such that the magnitude of each point of the normalized three-dimensional projection is equal to one. The normalized three-dimensional projection may be rotated into a corresponding projector space as a result of taking the cross product of a rotation matrix (R) and the normalized three-dimensional projection, such that the coordinates of the points of the normalized three-dimensional projection are corrected for rotational differences between the camera used to capture the image and the projector used to project the pattern. The rotation matrix is a matrix representation of the rotational difference between the camera used to obtain the image in which the captured two-dimensional coordinates was generated, and the projector used to project the overlap point cloud 415. For example, the rotation matrix may represent the rotational difference between the camera used to obtain the image and an SLM of the projector 105 or 110. The coordinates of the points in the corresponding projector coordinate space may be normalized to obtain the three-dimensional coordinates in the frames of reference 405 and 410. Advantageously, an obtained image may be used to determine three-dimensional coordinates of points in the coordinate systems of the projectors 105 or 110 as a result of using Equation (2), above, to account for characteristics of the camera and rotational differences between the camera and projector. Advantageously, the three-dimensional coordinates in the corresponding projector space may be converted between coordinate systems of the projectors 105 and 110 as a result of determining a rigid body transform.

A rigid body transform performed between the co-ordinate systems of the frames of reference 405 and 410 may be determined based on a first matrix of co-ordinates representative of the first frame of reference 405 ([x1, y1, z1]), a second matrix of co-ordinates representative of the second frame of reference 410 ([x2, y2, z2]), a scalar value (s), a rotation matrix (R), and a translation vector (T). The first matrix of coordinates represents the three-dimensional location of each point projected onto the arbitrary surface 115 corresponding to the coordinates of the first frame of reference 405. The second matrix of coordinates represents the three-dimensional location of each point projected onto the arbitrary surface 115 corresponding to the coordinates of the second frame of reference 410. The scalar value represents a scaling factor which accounts for a difference in total area between the point clouds of the frames of reference 405 and 410. For example, a scalar value greater than one represents that the area of the point cloud in the non-reference coordinate system is less than the area of the point cloud in the reference coordinate system. In such an example, the scalar value transforms the points in the non-reference coordinate system to a value which results in the total area being approximately equal to the reference coordinate system.

The rotation matrix is a matrix representation which accounts for a difference in a rotation between the coordinate systems. For example, the rotation matrix corrects the point cloud of the non-reference coordinate system to correct for a difference in a rotation of a projector (e.g., the projectors 105 and 110). In such an example, the rotation matrix includes a value to adjust the x coordinates, y coordinates, and/or z coordinates of the point cloud in the non-reference coordinate system to account for a rotational difference between the projectors 105 and 110. The rotation matrix may account for a horizontal rotation (V) and/or a vertical rotation (U), such that the rotation matrix is the product of V and a transverse of U. The translation vector represents an offset value which accounts for a difference in location of the points. For example, the translation vector may horizontally and/or vertically shift the point cloud of the non-reference coordinate system to match the reference coordinate system. In such an example, the translation vector may add or subtract different values from the x coordinates, y coordinates, and/or z coordinates in order to account for an offset value.

A rigid body transform performed between the co-ordinate systems of the frames of reference 405 and 410 may be determined based on a first matrix of co-ordinates ([x1, y1, z1]), a second matrix of co-ordinates ([x2, y2, z2]), a scalar value (s), a rotation matrix (R), and a translation vector (T). The first matrix of co-ordinates is a matrix of coordinates of points in the reference coordinate system. The second matrix of co-ordinates is a matrix of coordinates of points in the non-reference coordinate system. For example, the rigid body transform of Equation (3), below, may be used to transform the second matrix of coordinates to the first matrix of coordinates, such that the coordinates comprising the second matrix of coordinates are converted to the reference coordinate system. Advantageously, the rigid body transform of Equation (3), below, may be used to convert all coordinates in the non-reference system to coordinates in the reference coordinate system. A rigid body transform is represented by Equation (3), below, where the second matrix of coordinates correspond to the non-reference coordinate system. For example, a first point 420 may correspond to a second point 425 in the non-reference coordinate system of the second frame of reference 410. In such an example, the coordinates of the second point 425 result in a third point 430 in the reference coordinate system of the first frame of reference, such that a rigid body corrects the coordinates of the third point 430 match location of the second point 425 in the reference coordinate system at a fourth point 435. The rigid body transform of Equation (3), below, adjusts the coordinates of the third point 430 to match that of the fourth point 435. Advantageously, the rigid body transform of Equation (3), below, may be applied to convert the coordinates of the points in the second frame of reference 410 to the coordinates of the points in the first frame of reference 405, such that points in an image may be converted between coordinate systems of the projectors 105 and 110.

$$[x1,y1,z1] \mapsto s*R*[x2,y2,z2]+T, \quad \text{Equation (3)}$$

In the example of FIG. 4, the rigid body transform of Equation (3), above, may be performed to convert the geometric coordinates of the points of the second frame of reference 410 to the coordinate system of the first frame of reference 405 and vice versa. A minimization of the rotation matrix and translation vector may be performed to determine the scalar value, rotation matrix, and translation vector which optimizes the rigid body transform, such that the coordinates are transformed to the closest possible values. For example, minimization may be performed using a Procrustes transform to determine a best fit value for the scalar value, rotation matrix, and translation vector as represented by Equation (4), below. Alternatively, minimization may be performed using methods such as iterative non-linear least squares, etc.

$$\min_{R,T} \sum_{i}^{N} \|X1 - (s \cdot R \cdot X2 + T)\|^2, \quad \text{Equation (4)}$$

In the example of FIG. 4, the overlap point cloud 415 may be combined with the rigid body transform of Equation (3), above, where the coordinates of the points of the second frame of reference 410 are transformed to the first coordinate system corresponding to the first frame of reference 405. For example, the controller 120 determines a point cloud for an image to be projected by the projection system 100 using the coordinate system of the first projector 105 as the reference coordinate system as the overlap point cloud 415. In such an example, the controller 120 may solve the rigid body transform of Equation (3), above, for the second matrix of coordinates to determine coordinates of the points to be projected by the second projector 110 in the coordinate system of the second projector 110 as a result of transforming the coordinates from the reference system to the non-reference system. Alternatively, the coordinates of the points of the first frame of reference 405 may be transformed using Equation (3) and Equation (4), above, to convert the three-dimensional coordinates of the first reference coordinate system into coordinates of the second reference coordinate system corresponding to the second frame of reference 410. For example, the projection system 100 may determine the rigid body transform of Equation (3), above, as a result of using the coordinate system of the second camera 160 as the reference coordinate system and the coordinate system of the first camera 140 as the non-reference system. In such an example, the controller 120 determines the R, T, and s parameters of Equation (3), above, as a result of trying to match the first frame of reference 405 to the second frame of reference 410. Advantageously, the projection system 100 of FIG. 1 may transform the coordinate systems determined by each of the cameras 140 and 160 into a shared coordinate system using a rigid body transform of an image projected by either of the projectors 105 and 110.

FIG. 5 is an illustrative example of an example combination of point clouds 500 determined as a result of the rigid body transform illustrated in FIG. 4. In the example of FIG. 5, the combination of point clouds 500 includes a first example convex polygon 510, a second convex polygon 520, and a third convex polygon 530. The combination of point clouds 500 illustrates, using the reference coordinate system, the portions of the arbitrary surface 115 of FIG. 1 corresponding to each of the projectors 105 and 110 of FIG.

1. For example, points of the first convex polygon 510 represent the points which can be illuminated by the first projector 105. The combination of point clouds 500 illustrates the transformed points of the frames of reference 405 and 410 determined as a result of the rigid body transform of Equation (3), above, such that both polygons include points of the same coordinate system. In the example of FIG. 5, the combination of point cloud 500 contains two three-dimensional point clouds, however the combination of point cloud 500 is illustrated in two-dimensions for clarity and illustrative purposes.

In the example of FIG. 5, the first convex polygon 510 is an illustrative example of a portion of the arbitrary surface 115 that the first projector 105 may project an image on. The first convex polygon 510 includes a point cloud containing the points of the first frame of reference 405. The first convex polygon 510 represents the minimum convex polygon that encloses all of the points corresponding to the first projector 105. Alternatively, the co-ordinates of the first convex polygon 510 may be determined by the rigid body transform of Equation (2), above, as a result of mapping the points of the first frame of reference 405 to the co-ordinate system of the second frame of reference 410. The first convex polygon 510 may be determined as a result of finding a convex polygon configured to enclose all of the points corresponding to the first projector 105 such that an area of the first convex polygon 510 is minimized. For example, the first convex polygon 510 may be determined using the vertices of the geometric coordinates corresponding to the portion of the arbitrary surface 115 that may be illuminated by the first projector 105.

The second convex polygon 520 includes a point set corresponding to the portion of the arbitrary surface that may be illuminated by the second projector 110. The second convex polygon 520 represents the minimum convex polygon that is encloses all of the points corresponding to the second projector 110. The second convex polygon 520 may be determined as a result of finding a convex polygon which encloses all of the points corresponding to a point cloud containing points which may be illuminated by the second projector 110. For example, the second convex polygon 520 may be determined using the vertices of the geometric coordinates determined by using the rigid body transform of Equation (2), above. Alternatively, the second convex polygon 520 may include points of the co-ordinates of the second frame of reference 410 as a result of performing the rigid body transform to the points of the second frame of reference 410.

The third convex polygon 530 includes points included in both of the convex polygons 510 and 520. The third convex polygon 530 illustrates the portion of the arbitrary surface that may be illuminated by either of the projectors 105 or 110. The third convex polygon 530 is determined as an intersection of the convex polygons 510 and 520, such that the shared points determine a geometric area of the third convex polygon 530. The third convex polygon may be represented using Equation (5), below, where a first set of points ($A_1$) is the set enclosed by the first convex polygon 510, the second set of points ($A_2$) is the set of points enclosed by the second convex polygon 520, and the set enclosed by the third convex polygon 530 is the intersection set (x). Advantageously, the third convex polygon 530 may be used for either geometric correction or photometric correction, such that points within the third convex polygon 530 may be modified by a method of photometric correction to modify the perception of the area.

$$x \in A_1 \cap A_2, \quad \text{Equation (5)}$$

In the example of FIG. 5, the convex polygons 510 and 520 represents a minimum geometric area that encloses all of the points in a point set corresponding to the first projector 105 or the second projector 110. The third convex polygon 530 may be the minimum convex polygon that may represent a point set corresponding to both point sets corresponding to the projectors 105 and 110. Advantageously, the point clouds 500 represent the portions of the arbitrary surface 115 that may be used to project an image by the projection system 100 of FIG. 1.

FIG. 6 is an illustrative example of a corrected point cloud 600 based on the point cloud hull 500 of FIG. 5. In the example of FIG. 6, the corrected point cloud 600 is a rectangular point cloud determined based on the convex polygons 510 and 520 of FIG. 5. The corrected point cloud 600 illustrates a maximum internal bounding box where a size of a rectangular image that may be produced by the combination of the projectors 105 and 110 is maximized. The corrected point cloud 600 is a point cloud generated as a result of uniformly sampling and placing points within the maximum internal bounding box, such that points which are uniformly placed in the corrected point cloud 600 form a grid. The rectangular point cloud used to generate the corrected point cloud 600 may begin as a rectangular point cloud, which encloses the points comprising the convex polygons 510 and 520. The rectangular point cloud may be reduced to the corrected point cloud 600 by searching rows and/or columns for columns and/or rows to remove from the rectangular point cloud as a result of the column and/or row having a point not enclosed by the rectangular point cloud. Alternatively, the corrected point cloud 600 may be determined using arbitrary surface correction such that a best fit plane may be determined based on the union of the convex polygons 510 and 520. Advantageously, the corrected point cloud 600 illustrates the maximum rectangular image which may be projected by the projection system 100 of FIG. 1.

In the example of FIG. 6, the maximum internal bounding box may be determined to be a subset of the points of the convex polygons 510 and 520. The maximum internal bounding box may be determined based on searching the convex polygons 510 and 520 for minimum and maximum x-axis values, such that the difference between the minimum and maximum x-axis values is the width of the maximum internal bounding box. The y-axis values may be determined by searching the union of the convex polygons 510 and 520 for minimum and maximum y-axis values. The determined minimum and maximum x-axis and y-axis values may be uniformly sampled between coordinates, such that a rectangular point cloud is generated. The rectangular point cloud may be searched by row and/or column to eliminate any rows and/or columns containing points outside of the union of the convex polygons 510 and 520. For example, the controller 120 may search all of the columns of the rectangular point cloud to determine whether any columns contain points outside of the area bound by the convex polygons 510 and 520. In such an example, the controller 120 may remove the column from the rectangular point cloud as a result of determining that the column contains a point outside of the area bound by the convex polygons 510 and 520, such that the rectangular point cloud is transformed to the corrected point cloud 600 once all of the columns are found to only contain points bound within the area of the union of the convex polygons 510 and 520. Advantageously, the controller 120 may determine the maximum rectangular internal bounding box as a result of searching a rectangular point cloud for points outside of the union of the convex polygons 510 and 520.

The corrected point cloud 600 may be a three-dimensional point cloud, such that each point has a horizontal coordinate (x), a vertical coordinate (y), and a depth coordinate (z). A bi-linear interpolation of a plurality of nearest point may be used to determine an approximate depth of points of the corrected point cloud 600 that may not perfectly match a point in the point sets corresponding to the convex polygons 510 and 520. For example, the vertical and/or horizontal coordinate of an example point 620 may not correspond to a point contained in the point set of the first convex polygon 510, such that the depth coordinate of the point 620 is not known. In such an example, bi-linear interpolation of the depth coordinates of the four nearest neighbors may be used to determine a depth coordinate of the point 620. Alternatively, the depth coordinate of a point in the corrected point cloud 600 may be determined based on geometrically close points. Advantageously, the corrected point cloud 600 may include a vertical, horizontal, and depth coordinate of each point using interpolation.

FIG. 7A is an illustrative example of a first portion 700 of the corrected point cloud 600 of FIG. 6 corresponding to the first projector 105 of FIG. 1. In the example of FIG. 7A, the first portion 700 is a subset of the corrected point cloud 600 corresponding to a portion of the arbitrary surface 115 that the first projector 105 may project an image on. The first portion 700 is a left most portion of the corrected point cloud 600 contained by the first convex polygon 510. The first portion 700 includes a point cloud including uniformly placed points. The point cloud corresponding to the first portion 700 is the maximum area of the first convex polygon 510 included in the corrected point cloud 600. The first portion 700 is determined as a union of the first convex polygon 510 and the corrected point cloud 600.

In the example of FIG. 7A, the two-dimensional coordinates of the first portion 700 are determined based on the two-dimensional coordinates of the points of the corrected point cloud 600. The z-axis coordinate of the points of the first portion 700 may be determines based on the z-axis coordinates of the transformed point cloud. For example, a point in the first portion that shares an x-axis coordinate and a y-axis coordinate with a point in the transformed point cloud may be determined to have a z-axis coordinate approximately (preferably exactly) equal to each other. Alternatively, the z-axis coordinates may be determined based on the best fit plane determined by the arbitrary surface correction of FIG. 6. The z-axis coordinate may be determined for points of the first portion 700 using an approximation of points near the coordinates. For example, the controller 120 may determine a z-axis coordinate for a point based on one or more nearest neighbors, such that points near the point that is being approximated are used to determine the z-axis coordinate. The third coordinate of points of the corrected point cloud may be determined using bi-linear interpolation of one or more points which are nearest neighbors. For example, a depth coordinate may be determined based on the four closest points, where the depth coordinate of the four nearest neighbors are weighted and summed together to determine an estimate for a points depth coordinate. Alternatively, another method of estimating the third coordinate of a point including the corrected point cloud based on similar and/or nearby points including the corrected point cloud and/or the transformed point cloud.

FIG. 7B is an illustrative example of a second portion 720 of the corrected point cloud 600 of FIG. 6 corresponding to the second projector 110 of FIG. 1. In the example of FIG. 7B, the second portion 720 is a subset of the corrected point cloud 600 corresponding to a portion of the arbitrary surface 115 that the second projector 110 may project an image on. The second portion 720 is a right most portion of the corrected point cloud 600 contained by the second convex polygon 520. The second portion 720 includes a point cloud including uniformly placed points. The point cloud corresponding to the second portion 720 is the maximum area of the second convex polygon 520 included in the corrected point cloud 600. The second portion 720 is determined as a union of the second convex polygon 520 and corrected point cloud 600. The depth coordinate of the second portion 720 may be determined similar to the determination of the depth coordinate for the first portion 700, such that the depth coordinate may be determined based on a three-dimensional point cloud.

In the example of FIG. 7B, the points of the corrected point cloud 600 including the second portion 720 are of coordinates of the reference coordinate system, the coordinate system of the first projector 105, used to generate the corrected point cloud 600. The coordinates of the point including the second portion 720 may be converted to coordinates of the second projector 110 as a result of applying an inverse of the rigid body transform of Equation (3), above. The inverse rigid body transform may be performed using Equation (6), below, where the reference system coordinates (x) are converted to non-reference system coordinates based on a transverse of the rotation matrix (RT), the translation vector (T), and the scalar value (s). Intrinsic parameters of Equation (6), below, include the rotation matrix, translation vector, and scalar value used in Equation (3), above, to transform the coordinates of the points of the second frame of reference 410 of FIG. 4 to coordinates in the first frame of reference 405 of FIG. 4, such that the inverse rigid body transform of Equation (6), below, transforms the coordinates of the points including the second portion into coordinates of the second projector 110.

$$x \mapsto R^T * \frac{(x - T)}{s},\qquad\text{Equation (6)}$$

Alternatively, the inverse rigid body transform of Equation (4), above, may be used to transform coordinates in the coordinate system of the second projector 110 to coordinates in the coordinate system of the first projector 105 as a result of determining the intrinsic parameters using the coordinate system of the second projector 110 as the reference system. Advantageously, the inverse rigid body transform of Equation (4), above, transforms the coordinates of the second portion 720 to values which may be projected by the second projector 110.

Advantageously, the first portion 700 of FIG. 7A and the second portion 720 of FIG. 7B represent the desired portions of the arbitrary surface 115 of FIG. 1 that may be used to project an image that has been geometrically corrected. The portions 700 and 720 may be used by the projection system 100 of FIG. 1 to determine a warp map for the area corresponding to the projection of the portions 700 and 720. For example, a warp map of the area corresponding to the first portion 700 is generated as a result of using the cameras 140 and/or 160 of FIG. 1 to determine coordinates of the points including the point cloud of the first portion 700 during a duration where the point cloud is being projected by the first projector 105 onto the arbitrary surface 115. In such an example, distortions to the point cloud including the first portion 700 may be determined as a result of a comparison of the coordinates of the points including the warp map to the coordinates of the points including the point cloud of the first portion 700. Advantageously, a warp map may be generated by projecting a portion of the corrected point cloud 600 of FIG. 6 onto the arbitrary surface 115, such that the arbitrary surface 115 is the only component distorting the portion of the corrected point cloud 600.

The warp maps being generated using the portions 700 and 720 may be used by the projection system 100 to warp content, to be projected, to counter the warping resulting from the arbitrary surface 115, such that the projection system 100 is configured to warp and project images. The warped content allows the distortions of the arbitrary surface 115 to correct the content, such that the content may be perceived in a manner that is similar (preferably exactly) to as if there were no distortions to the image, such warping may be referred to as a distortion. The warping of the content prior to projection may be determined as a result of the comparison of the coordinates of a point in the corrected point cloud 600 to the coordinates of the point in the warp map. For example, the controller 120 may increase the y-axis coordinate of a point, including an image to be projected by the first projector 105, as a result of determining that a y-axis coordinate of the point is lower in the warp map than in the corrected point cloud 600. Advantageously, warp maps may be configured to warp an image in a manner which may counter distortions caused by the arbitrary surface 115.

The controller 120 may use the generated warp maps to distort an image prior to projecting the image to correct for non-linear distortions of the image by the arbitrary surface 115. The controller 120 may distort an x-axis and y-axis coordinate of the points as a result of converting the three-dimensional point cloud coordinates to a reference system of the projector, such as to reverse the conversion performed by Equation (2), above. Equation (2), above, converts the two-dimensional coordinates determined from an image to a three-dimensional projection (x) where the captured two-dimensional points are offset by coordinates of the principal point and divided by the focal point lengths. Equation (7), below, maps the three-dimensional coordinates to two-dimensional coordinates, which may be used by the projectors 105 and 110 to project an image, using two-dimensional points ($[x_w, y_w]$), a camera focal point ($[f_x, f_y]$), and a camera principal point ($[p_x, p_y]$). The two-dimensional points are the x-axis and y-axis coordinates of the three-dimensional coordinates of a point to be projected. The two-dimensional points may be transformed from a three-dimensional value by removing the z-axis value. The camera focal point is an x-axis and y-axis coordinate of a focal point of the camera used to capture the image. The camera focal point may be referred to as a pinhole camera which capture images as a result of reflections of light through a pinhole, such that the focal point of the camera is determined based on the pin hole of the camera used. The camera principal point is an x-axis and y-axis coordinate of the point where the image plane and optical axis intersect. The camera principal point in a pinhole camera is approximately the center of the image, such that a ray perpendicular to image plane at the principal point intersects with the pinhole. Using Equation (7), below, the controller 120 maps the three-dimensional coordinates which may be configured to warp the image from coordinates in the coordinate system of the camera to the coordinate system of the projector. Advantageously, the controller 120 may determine values to pre-distort an image as a result of converting values, which may be used to pre-distort the points of the image, into the coordinate system of the projector 105 or 110.

$$[x_w, y_w] \mapsto [(x_w * f_x) + p_x, (y_w * f_y) + p_y], \qquad \text{Equation(7)}$$

FIG. 8A is an illustrative example of a first corrected point cloud 800 based on a first example convex polygon 810 and a second example convex polygon 820. The first corrected point cloud 800 is a rectangular point cloud which may be generated similar to the corrected point cloud 600 of FIG. 6. In the example of FIG. 8A, the first corrected point cloud 800 is generated as a result of generating a rectangular point cloud with corners at the points of the convex polygons 810 and 820, such that the rectangular point cloud encloses both of the convex polygons 810 and 820. The rectangular point cloud is searched based on rows and/or columns of points to remove any rows and/or columns of points which contain points outside the area bound by the convex polygons 810 and 820. For example, the controller 120 of FIGS. 1 and 2 may search the first corrected point cloud 800 based on columns of points to remove any columns which contain points outside of the area bound by the convex polygons 810 and 820, such that the first corrected point cloud 800 contains the maximum number of columns of points bound by the convex polygons 810 and 820. Alternatively, the controller 120 may perform another form of reduction, such as least means square regression, stochastic gradient descent, etc. Advantageously, the first corrected point cloud 800 represents the maximum area that is bound by the convex polygons 810 and 820 that a rectangular image may be projected.

The convex polygons 810 and 820 represent areas that may be illuminated by a projector determined as a result of capturing reflections of projections of Gaussian structured light patterns and determining a rigid body transform, such that the convex polygons 810 and 820 share the same coordinate system. For example, the first convex polygon 810 may represent the area of the arbitrary surface 115 of FIGS. 1 and 2 which may be illuminated by the first projector 105 of FIGS. 1 and 2. In such an example, the first convex polygon 810 may be in the coordinate system of the first projector 105 as a result of determining a rigid body transform to map coordinates in the second projectors 110 of FIGS. 1 and 2 coordinate system into the first projectors 105 coordinate system, such that the second convex polygon 820 represents the portion of the arbitrary surface 115 which may be illuminated by the second projector 110. The convex polygons 810 and 820 may be generated similarly to the convex polygons 510 and 520 of FIGS. 5-7B. Advantageously, the union of the convex polygons 810 and 820 represents the portions of the arbitrary surface 115, which may be illuminated by the projection system 100 of FIG. 1.

FIG. 8B is an illustrative example of a second example corrected point cloud 830 based on the first corrected point cloud 800 of FIG. 8A and the first convex polygon 810 of FIG. 8A. The second corrected point cloud 830 is a portion of the first corrected point cloud 800 that is bound by the first convex polygon 810. The second corrected point cloud 830 is the portion of the first corrected point cloud 800 that may be illuminated by the first projector 105 of FIGS. 1 and 2. The second corrected point cloud 830 may be determined similarly to the method of reducing the rectangular point cloud to generate the first corrected point cloud 800. For example, the controller 120 of FIGS. 1 and 2 may search the first corrected point cloud 800 for columns of points which are bound by the first convex polygon 810. In such an example, the second corrected point cloud 830 is determined based on the area bound by the first convex polygon 810, such that only points which may be illuminated by the first projector 105 form the second corrected point cloud 830. Alternatively, another method of reducing the first corrected point cloud 800 to generate the second corrected point cloud 830 may be used to determine points which may be illuminated by the first projector 105. Advantageously, the second corrected point cloud 830 covers a maximum area of the first convex polygon 810, such that the maximum portion of the arbitrary surface 115 of FIGS. 1 and 2, in which an image may be projected without misalignments, is being used.

Figure 8C:
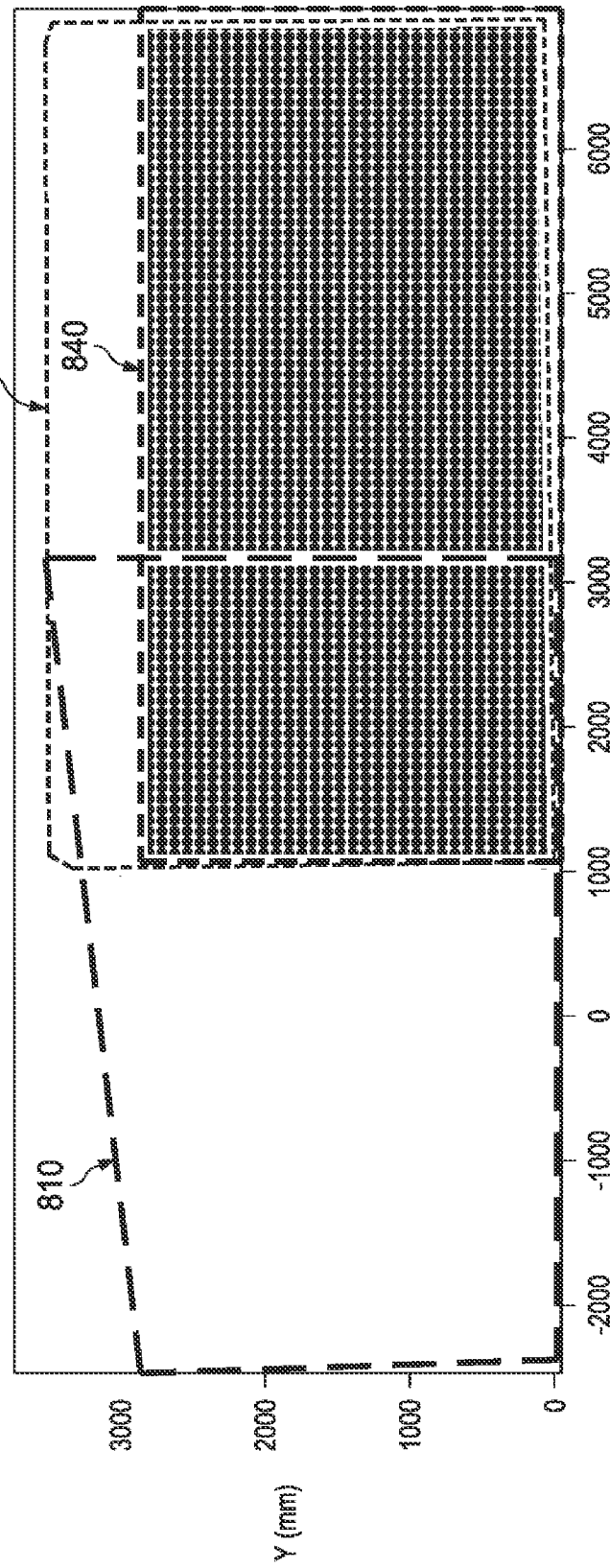
FIG. 8C is an illustrative example of a third example corrected point cloud based on the first corrected point cloud of FIG. 8A and the second convex polygon of FIG. 8A.

FIG. 8C is an illustrative example of a third example corrected point cloud 840 based on the first corrected point cloud 800 of FIG. 8A and the second convex polygon 820 of FIG. 8A. The third corrected point cloud 840 is a portion of the first corrected point cloud 800 that is bound by the second convex polygon 820. The third corrected point cloud 840 is the portion of the first corrected point cloud 800 that may be illuminated by the second projector 110 of FIGS. 1 and 2. The third corrected point cloud 840 may be determined similarly to the method of reducing the rectangular point cloud to generate the first corrected point cloud 800. For example, the controller 120 of FIGS. 1 and 2 may search the first corrected point cloud 800 for columns of points which are bound by the second convex polygon 820. In such an example, the third corrected point cloud 840 is determined based on the area bound by the second convex polygon 820, such that only points which may be illuminated by the second projector 110 form the third corrected point cloud 840. Alternatively, another method of reducing the first corrected point cloud 800 to generate the third corrected point cloud 840 may be used to determine points which may be illuminated by the second projector 110. Advantageously, the third corrected point cloud 840 covers a maximum area of the second convex polygon 820, such that the maximum portion of the arbitrary surface 115 of FIGS. 1 and 2, in which an image may be projected without misalignments, is being used.

In the example of FIGS. 8A-8C, the portion of the first corrected point cloud 800 which is shared between the convex polygons 810 and 820 may be used to perform photometric correction. Photometric correction may involve modifying the brightness, color temperature, etc. of the light being modulated by the SLMs 125 and 145, such that an image projected by the projection system 100 is uniformly perceived. For example, the controller 120 may decrease the brightness of the portions of the corrected point clouds 830 and 840, which are shared between the convex polygons 810 and 820. Alternatively, the controller 120 may remove the points shared between the convex polygons 810 and 820 from one of the corrected point clouds 830 or 840, such that only one of the projectors 105 or 110 are illuminating the portion of the arbitrary surface 115. Advantageously, the first corrected point cloud 800 may be used to perform photometric correction, such that the integration complexity of implementing photometric correction is reduced.

Figure 9A:
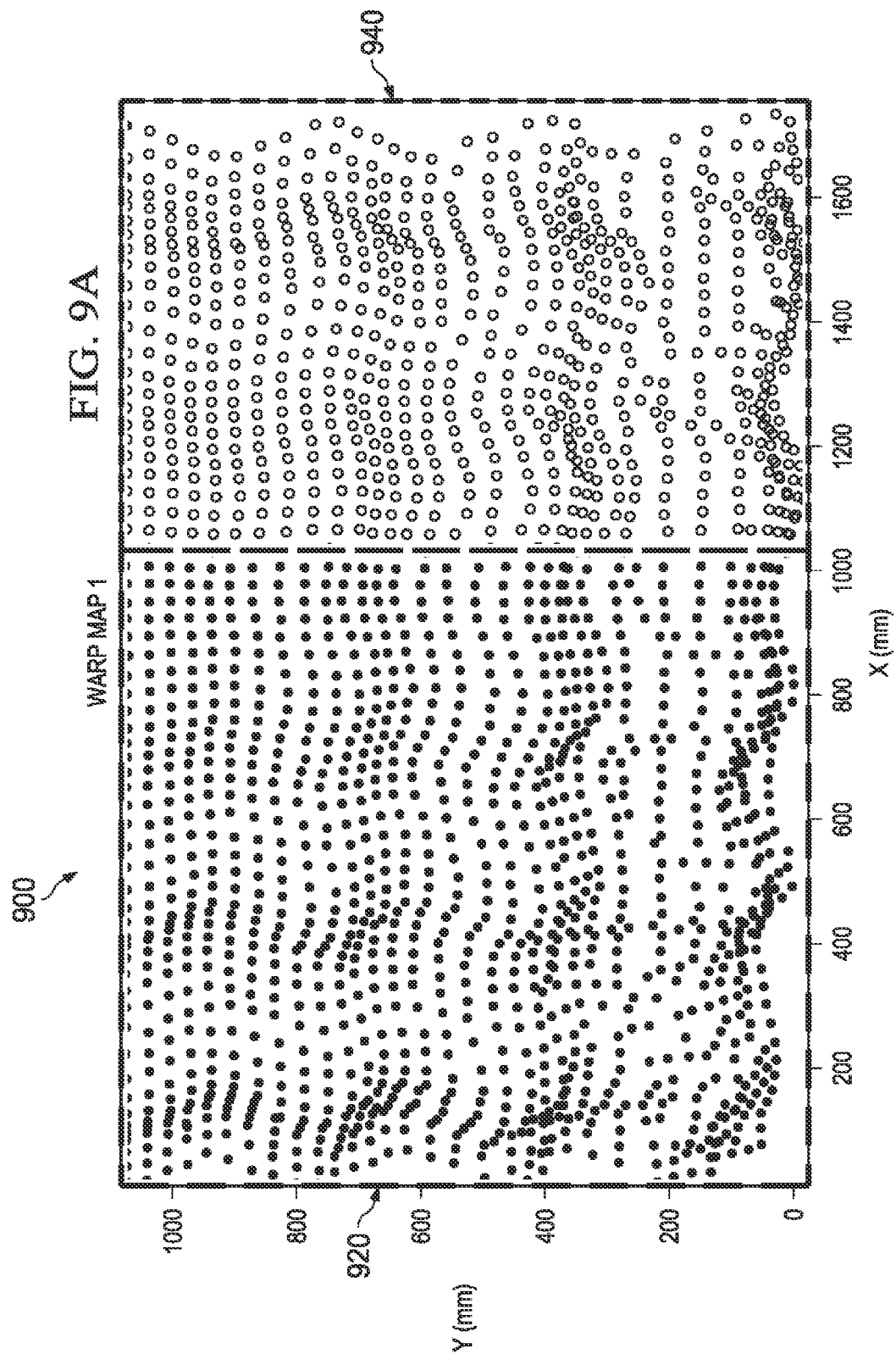
FIG. 9A is an illustrative example of a first warp map corresponding to the first projector of FIG. 1.

FIG. 9A is an illustrative example of a first warp map 900 corresponding to the first projector 105 of FIG. 1. In the example of FIG. 9A, the first warp map 900 includes an example first region 920 and a second region 940. The first warp map 900 may be generated as a result of using the camera 140 or 160 of FIG. 1 to determine coordinates of a portion of a corrected point cloud that is being projected onto an arbitrary surface. For example, the first warp map 900 is generated as a result of determining the coordinates of the points including the first portion 700 of FIG. 7A being projected by the first projector 105. In such an example, the determined coordinates compared to the corrected point cloud coordinates represent the warping of the point cloud resulting from the arbitrary surface 115 of FIG. 1. The first warp map 900 illustrates a projection of the point cloud corresponding to the first portion 700 of FIG. 7A while being projected onto a portion of the arbitrary surface corresponding to the first projector 105. The first warp map 900 may be used to determine a warping that may be performed on an image by the controller 120 of FIG. 1 to reduce non-linear distortions of the image caused by the shape of the arbitrary surface 115.

In the example of FIG. 9A, the first region 920 illustrates a portion of the corrected point cloud corresponding to the left most portion of the arbitrary surface. The first region 920 corresponds to a geometric area of the arbitrary surface that may be illuminated by a single projector (e.g., the projectors 105 or 110 of FIG. 1). For example, the first region 920 may be a left most portion of the arbitrary surface 115 which is illuminated by the first projector 105. The first region 920 illustrates the corrected point cloud, generated using cross capture of structured light patterns projected by the first projector 105 and a rigid body transform, being projected onto the arbitrary surface.

The second region 940 illustrates a portion of the portion of the corrected point cloud corresponding to a geometric area that one or more projectors may illuminate. For example, the second region 940 may be the portion of the corrected point cloud 600 located within the third convex polygon 530 of FIG. 5. In such an example, the projectors 105 and 110 may both illuminate the portion of the arbitrary surface 115 corresponding to the second region 940.

FIG. 9B is an illustrative example of a second warp map 950 corresponding to the second projector 110 of FIG. 1. In the example of FIG. 9B, the second warp map 950 includes an example first region 960 and a second region 980. The second warp map 950 may be generated as a result of using the camera 140 or 160 of FIG. 1 to determine coordinates of a portion of a corrected point cloud that is being projected onto an arbitrary surface. For example, the second warp map 950 is generated as a result of determining the transformed coordinates of the points including the second portion 720 of FIG. 7B being projected by the first projector 105. In such an example, the determined coordinates compared to the transformed corrected point cloud coordinates represent the warping of the point cloud resulting from the arbitrary surface 115 of FIG. 1. The second warp map 950 illustrates a projection of the point cloud corresponding to the second portion 720 of FIG. 7B while being projected onto the image plane of the second projector 110 of FIG. 1. The second warp map 950 may be used to determine a warping that may be performed by the controller 120 to reduce non-linear distortions of the image caused by the shape of the arbitrary surface 115.

In the example of FIG. 9B, the first region 960 illustrates a portion of the portion of the corrected point cloud corresponding to a geometric area that one or more projectors may illuminate. For example, the first region 960 may be the portion of the corrected point cloud 600 located within the third convex polygon 530 of FIG. 5. In such an example, the projectors 105 and 110 may both illuminate the portion of the arbitrary surface 115 corresponding to the second region 980.

The second region 980 illustrates a portion of the corrected point cloud corresponding to the right most portion of the arbitrary surface. The second region 980 corresponds to a geometric area of the arbitrary surface that may be illuminated by a single projector (e.g., the projectors 105 and 110 of FIG. 1). For example, the second region 980 may be a right most portion of the arbitrary surface 115 which is illuminated by the second projector 110. The second region 980 illustrates the corrected point cloud, generated using cross capture of structured light patterns projected by the second projector 110 and a rigid body transform, being projected onto the arbitrary surface.

Figure 10A:
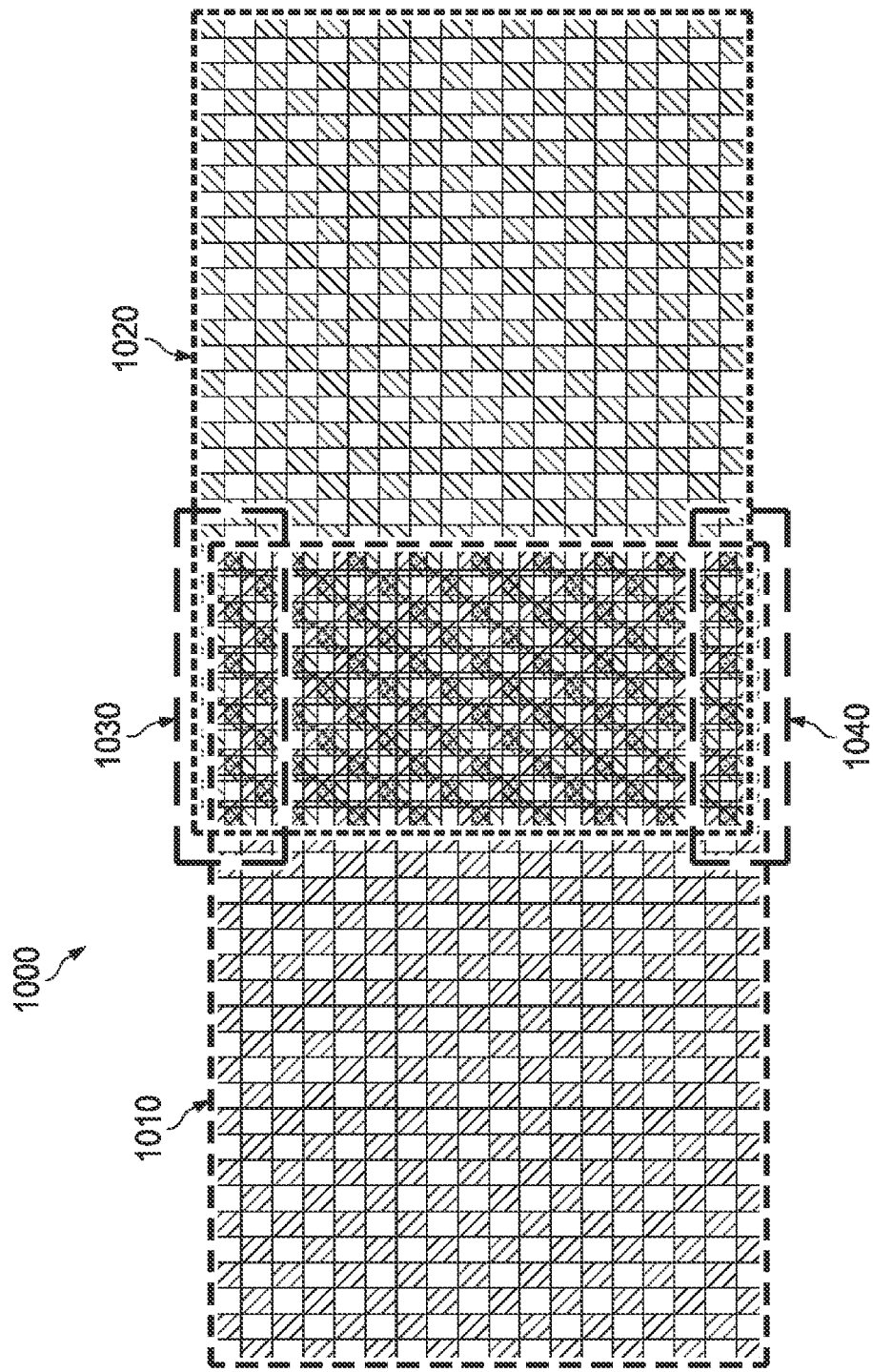
FIG. 10A is an illustrative example of a first uncorrected projection including a first portion and a second portion.

FIG. 10A is an illustrative example of a first uncorrected projection 1000 including a first portion 1010 and a second portion 1020. In the example of FIG. 10A, the first uncorrected projection 1000 includes the first portion 1010, the second portion 1020, an example first misalignment 1030, and a second misalignment 1040. The first uncorrected projection 1000 illustrates a potential projection by two projectors (e.g., the projectors 105 and 110 of FIG. 1) that may initiate a geometric correction based on determining the presence of the misalignments 1030 and 1040.

In the example of FIG. 10A, that first portion 1010 includes a left most geometric area of an arbitrary surface (e.g., the arbitrary surface 115 of FIG. 1) which a projector may illuminate based on an orientation of the projector. The orientation of the projector may include a rotation or placement in relation to another projector which may generate a misalignment (e.g., the misalignments 1030 and 1040) that alters the perception of an image projected by one or more projectors. For example, an image projected by the first projector 105 may be larger than intended as a result of moving the first projector 105 further away from the arbitrary surface 115. The second portion 1020 includes a right most geometric area of the arbitrary surface which a projector may illuminate based on an orientation of the projector.

The misalignments 1030 and 1040 are portions of both of the portions 1010 and 1020 including the first uncorrected projection 1000. The misalignments 1030 and 1040 illustrate a discontinuity between a first projector and a second projector which may be a result of a misalignment between projectors, a distorted projection surface (e.g., the arbitrary surface 115), etc. For example, the first portion 1010 may be just below the second portion 1020 as a result of the first projector being tilted downwards and/or the second projector being tilted slightly upwards. The misalignments 1030 and 1040 may be perceived by one or more cameras to initiate a geometric correction. Advantageously, the misalignments 1030 and 1040 may be corrected using geometric correction.

Figure 10B:
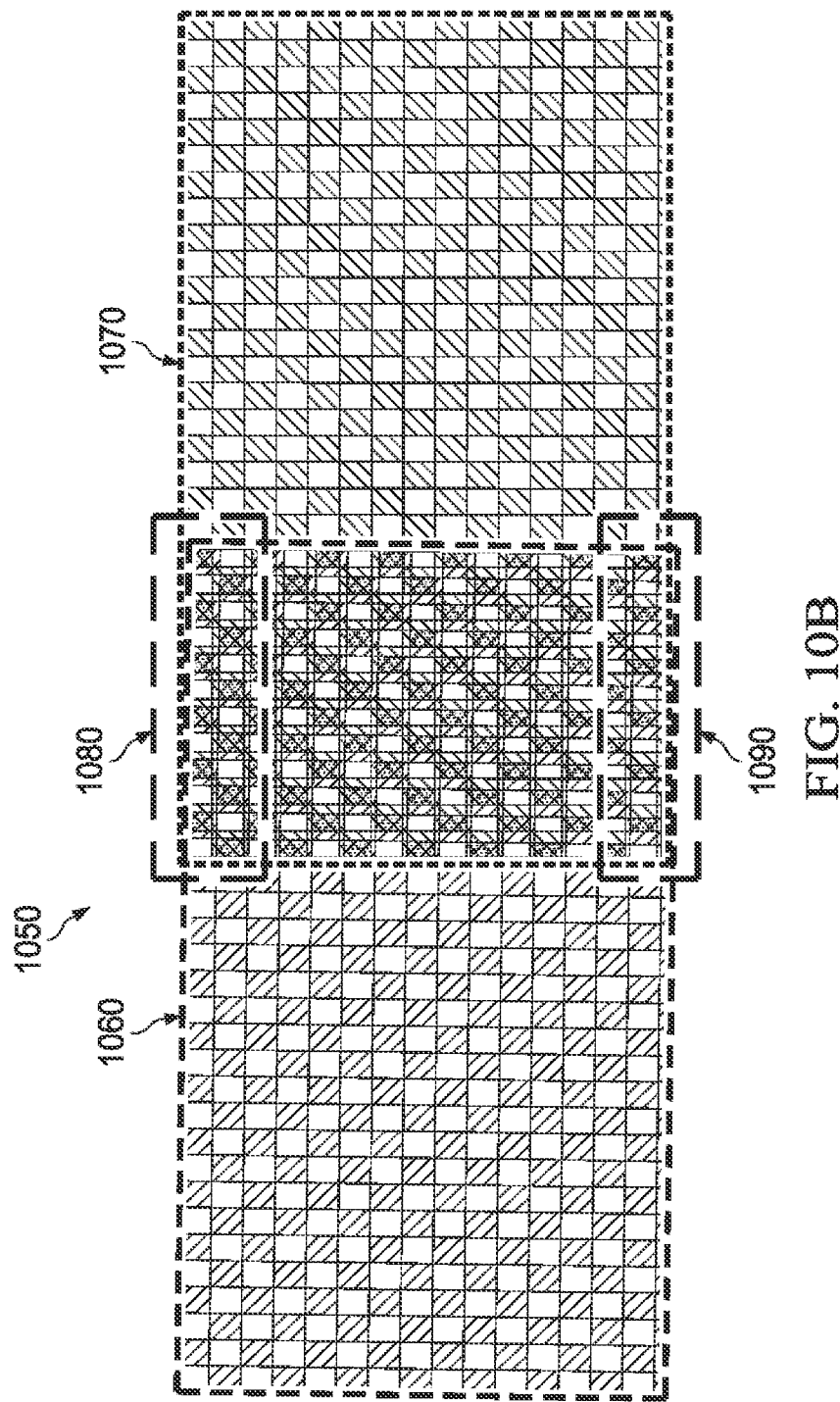
FIG. 10B is an illustrative example of a second uncorrected projection including a first portion and a second portion.

FIG. 10B is an illustrative example of a second uncorrected projection 1050 including a first portion 1060 and a second portion 1070. In the example of FIG. 10B, the second uncorrected projection 1050 includes the first portion 1060, the second portion 1070, an example first misalignment 1080, and a second misalignment 1090. The second uncorrected projection 1050 illustrates a potential projection by two projectors (e.g., the projectors 105 and 110 of FIG. 1) that may initiate a geometric correction based on determining the presence of the misalignments 1080 and 1090.

The misalignments 1080 and 1090 may be a result of a first projector being on an incline and/or out of alignment with a second projector. For example, the first projector 105 may be setup on a slight incline while the second projector 110 is setup on a level surface. Alternatively, the misalignments 1080 and 1090 may be caused by a rotation, non-uniform arbitrary projection surface (e.g., the arbitrary surface 115 of FIG. 1), etc. Advantageously, the misalignments 1080 and 1090 may be corrected using geometric corrections.

Figure 11:
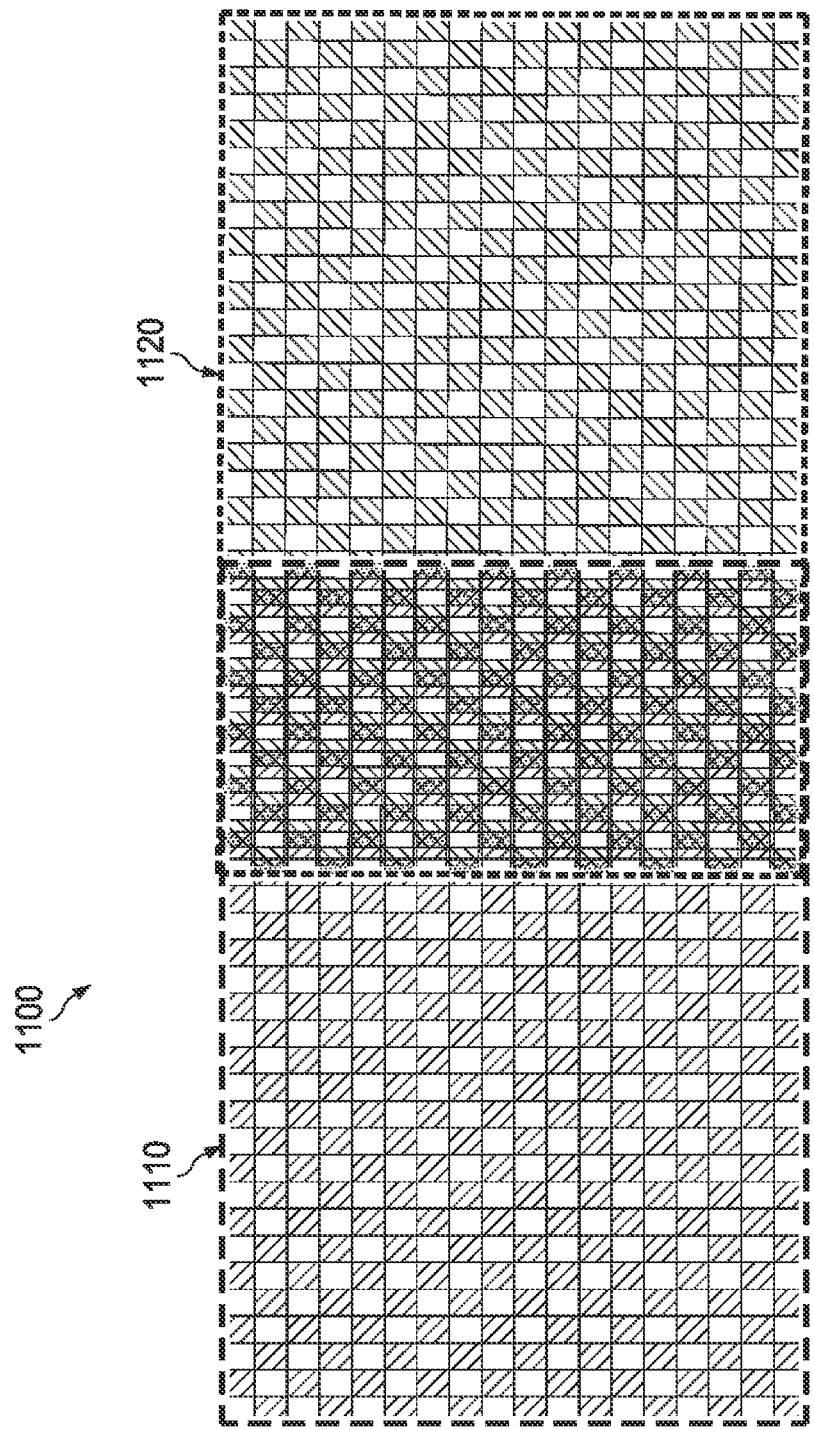
FIG. 11 is an illustrative example of a corrected projection of the uncorrected projection of FIG. 9A including a first portion and a second portion after implementing geometric correction.

FIG. 11 is an illustrative example of a corrected projection 1100 of the first uncorrected projection 1000 of FIG. 9A including a first portion 1110 and a second portion 1120 after implementing geometric correction. In the example of FIG. 11, the corrected projection 1100 includes the first portion 1110 and the second portion 1120. The corrected projection 1100 illustrates the first uncorrected projection 1000 after geometric correction is applied to the portions 1010 and 1020 of FIG. 10A, such that the misalignments 1030 and 1040 of FIG. 10A are reduced.

The first portion 1110 includes a portion of the image, projected by a combination of the portions 1110 and 1120, which has been geometrically corrected. Portions of the first portion 1110 may be illustrated as a distorted version of the same portion of the first portion 1010 as a result of the geometric correction adjusting for a determined distortion (e.g., the misalignments 1030 and 1040). Advantageously, the first portion 1010 may be geometrically corrected to reduce the misalignments 1030 and 1040.

The second portion 1120 includes a portion of the image, projected by a combination of the portions 1110 and 1120, which has been geometrically corrected. Portions of the second portion 1120 may be illustrated as a distorted version of the same portion of the second portion 1020 as a result of the geometric correction adjusting for a determined distortion (e.g., the misalignments 1030 and 1040). Advantageously, the second portion 1020 may be geometrically corrected to reduce the misalignments 1030 and 1040.

Figure 12:
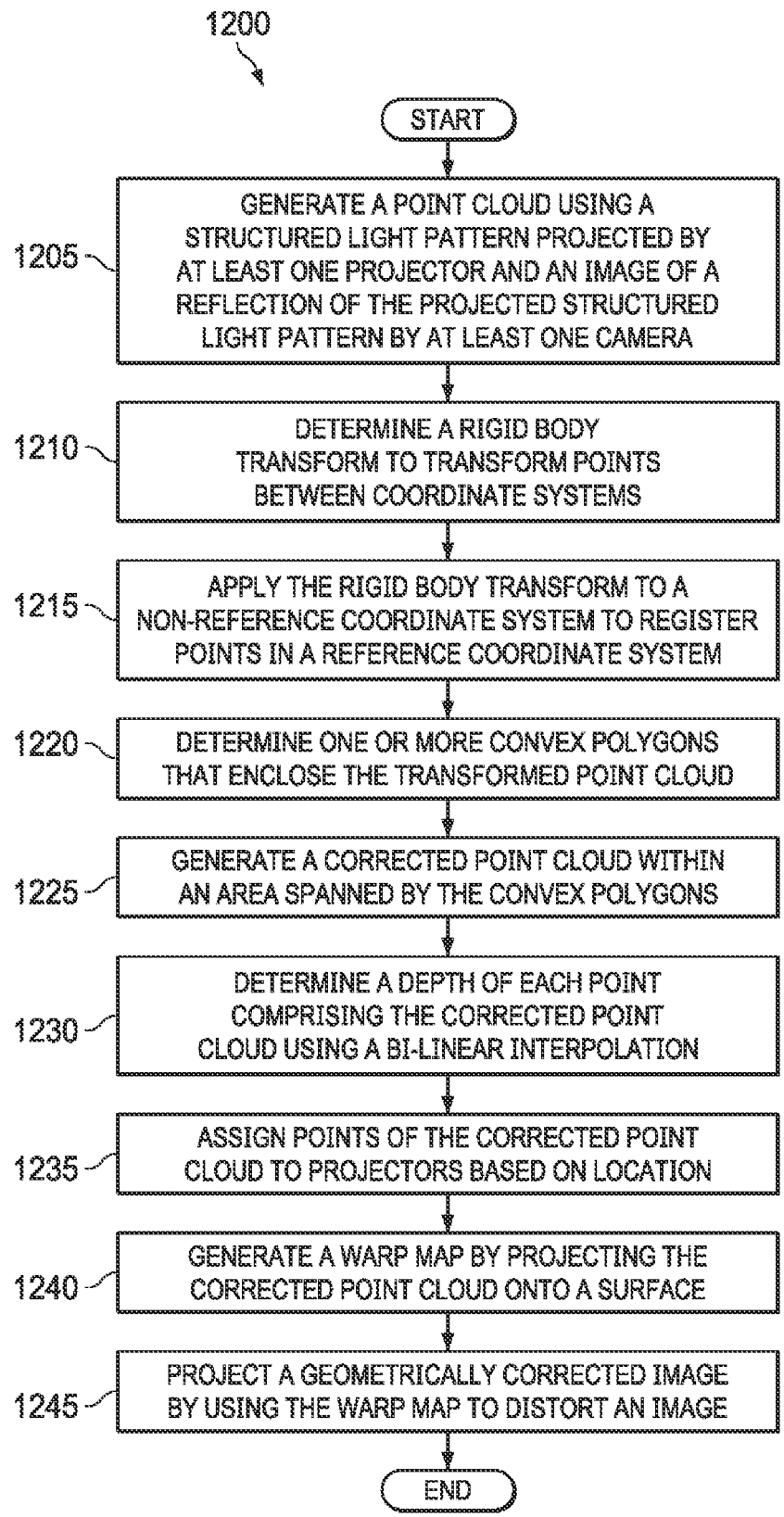
FIG. 12 is a flowchart representative of an example process that may be performed using machine readable instructions that can be executed and/or hardware configured to implement the projection system of FIG. 1, and/or, more generally, the controller of FIG. 1 to perform geometric correction.

FIG. 12 is a flowchart 1200 representative of an example process that may be performed using machine readable instructions that can be executed and/or hardware configured to implement the projection system 100 of FIG. 1, and/or, more generally, the controller 120 of FIG. 1 to perform geometric correction. The machine-readable instructions begin at block 1205, at which the controller generates a point cloud using a structured light pattern projected by at least one projector and an image of a reflection of the projected structured light pattern captured by at least one camera. At block 1205, the controller instructs the at least one projector to project structured light patterns (e.g., the Gaussian structured light patterns 300, 304, 310, 312, and 314 of FIGS. 3A-3E). The controller uses at least one of the cameras to capture at least one image of the structured light patterns being projected by the projectors. The controller may use triangulation to determine coordinates of points of the structured light pattern as a result of comparing coordinates of points captured by both of the cameras 140 and 160. The controller generates a point cloud of a reference coordinate system using triangulation between the points of the structured light pattern in the captured image. For example, the controller 120 may determine coordinates of the points of the first Gaussian structured light pattern 300 of FIG. 3A as a result of the first SLM 125 of FIG. 1 projecting the first Gaussian structured light pattern 300 and the cameras 140 and/or 160 of FIG. 1 capturing an image of the perceived output. In such an example, the image captured by the cameras 140 and/or 160 is used by the controller 120 to determine coordinates of the points using triangulation. Alternatively, the cameras 140 and 160 may be used to generate two-point clouds of the first Gaussian structured light pattern 300 including geometric coordinates in two separate coordinate systems corresponding to both of the projectors 105 and 110. At block 1205, the controller may use triangulation between one SLM and two or more cameras to uniquely determine surface characteristics of an arbitrary surface. For example, the controller 120 may determine a coordinate of a point corresponding to a centroid in the coordinate system of the first projector 105 as a result of using triangulation between coordinates obtained by the first camera 140 and coordinates obtained by the second camera 160 of structured light patterns being projected by the first SLM 125. In such an example, the controller 120 may determine a coordinates of points corresponding to centroids in the coordinate system of the second projector 110 as a result of using triangulation between coordinates obtained by the first camera 140 and coordinates obtained by the second camera 160 of structured light patterns being projected by the second SLM 145. At block 1205, the controller may use a plurality of structured light patterns (e.g., the Gaussian structured light patterns 300, 304, 310, 312, and 314 of FIGS. 3A-3E) to generate the point cloud. The controller proceeds to block 1210.

At block 1205, the controller 120 may project and obtain images of a plurality of structured light patterns to determine the portions of the arbitrary surface that may be illuminated by the projection system 100. For example, the controller 120 may generate an accurate determination of the portions of the arbitrary surface, which may be illuminated by either of the projectors 105 or 110 as a result of projecting a plurality of different structured light patterns. In such an example, the controller 120 may use Equation (1), above, to determine the number of structured light patterns to accurately determine coordinates of points including a point cloud that spans the portions of the arbitrary surface, which may be illuminated by the projection system 100. At block 1205, the controller 120 may generate a point cloud for both of the projectors 105 and 110. For example, the controller 120 may use the cameras 140 and 160 to obtain images of structured light patterns projected by the first projector 105 to determine a point cloud representing the portion of the surface illuminated by the first projector. In such an example, the controller 120 may determine the portion of the arbitrary surface 115 illuminated by the second projector 110 as a result of obtaining images of structured light patterns being projected by the second projector 110 using cameras 140 and 160.

Advantageously, the projection system 100 may generate a point cloud representation of the portions of the arbitrary surface that may be illuminated by a projector as a result of determining the coordinates of points across a plurality of images.

At block 1210, the controller determines a rigid body transform to transform points between coordinate systems. At block 1210, the controller may determine a rigid body transform between a coordinate system of a first projector and a coordinate system of a second projector to convert a point cloud representative of the second projector to coordinates in the coordinate system of the first projector. For example, the controller 120 may use two images of a spatial light pattern being projected by the first projector 105 to generate a first frame of reference and a second frame of reference of the pattern, such that the spatial light pattern has coordinates in the coordinate systems of both projectors 105 and 110. In such an example, the controller 120 may select the coordinate system associated with the first camera 140 as a reference coordinate system, such that the coordinates determined in the image from the second camera 160 are to be transformed into the reference coordinate system. At block 1210, the controller determines the intrinsic parameters of the rigid body transform of Equation (3), above, using Equation (4), above, to convert geometric coordinates of points captured by one camera to the coordinate system corresponding to the first projector 105. For example, the controller 120 may use Equation (4), above, to determine a rotation matrix and a translation matrix, to convert the points that may be illuminated by the second projector 110 to coordinates in the coordinate system of the first projector 105. Alternatively, the controller 120 may determine a rigid body transform that converts the coordinates of points in the coordinate system corresponding to the first projector 105 to the coordinate system corresponding to the second projector 110. The controller proceeds to block 1215.

At block 1215, the controller applies the rigid body transform to a non-reference coordinate system to register points in a reference coordinate system. For example, the controller 120 may apply the rigid body transform determined at block 1210 to convert the point cloud corresponding to the coordinate system of the second projector 110 to the coordinate system of the first projector 105. Alternatively, the coordinate system corresponding to the second projector 110 may be the reference coordinate system, such that the geometric coordinates of the point cloud generated with the coordinate system of the first projector 105 is converted to the coordinate system of the second projector 110. The controller proceeds to block 1220.

At block 1220, the controller determines one or more convex polygons that enclose the transformed point cloud. In the example of FIG. 12, the transformed point cloud includes the union of the points transformed from the non-reference coordinate system and points determined using coordinates of the reference coordinate system, such that the transformed point cloud includes all of the points that may be projected by either of the projectors 105 or 110. At block 1220, the controller may determine three convex polygons. A first polygon represents the points projected by a first projector. A second polygon represents the points projected by a second projector. The first and second polygons are convex polygons that are determined based on the vertices of the points being enclosed, such that the polygons are a minimum size that encloses all corresponding points. A third polygon encloses points that are shared between the first polygon and the second polygon. For example, the controller 120 uses the vertices of points of the first convex polygon 510 of FIG. 5 to determine a minimum area that encloses all of the points corresponding to the first projector 105. In such an example, the controller 120 determines the third convex polygon 530 of FIG. 5 by using the vertices of points resulting from a mathematical union of the points of the first convex polygon 510 and the points of the second convex polygon 520 of FIG. 5. The controller may additionally determine the points that are a part of both convex polygons (e.g., the third convex polygon 530 of FIG. 5). The portions of the transformed point cloud represents the portions of an arbitrary surface (e.g., the arbitrary surface 115) that both projectors may illuminate. The controller proceeds to block 1225.

At block 1225, the controller generates a corrected point cloud within an area spanned by the convex polygons. At block 1225, the controller may generate a rectangular point cloud the encloses the area of all of the convex polygons, such that every point within the convex polygons is included in the rectangular point cloud. The controller may reduce the rectangular point cloud to only points within the convex polygons by removing rows and/or columns of the rectangular point cloud, which include points outside of the area spanned by the convex polygons. For example, the corrected point cloud 600 of FIG. 6 is generated within the area spanned by the convex polygons 510 and 520, such that a maximum rectangular point cloud is generated. In such an example, the corrected point cloud 600 may include a maximum number of points which may form a rectangular point cloud within the corrected point cloud 600, such that the points are evenly distributed across the width and height of the rectangular point cloud. Advantageously, the projection system maximizes the portions of the arbitrary surface 115 in which an image may be projected as a result of maximizing the area covered by the rectangular point cloud, such that increasing the area of the rectangular point cloud would result in distortions of the image that may not be countered using geometric correction. The controller proceeds to block 1230.

At block 1230, the controller determines a depth of the points of the corrected point cloud using a bi-linear interpolation. For example, the controller 120 may be configured to determine the depth of a corrected point that is a part of the corrected point cloud 600 based on the depth of the four points whose coordinates are the closest to the corrected point in the point cloud generated by applying the rigid body transform of block 1215. Advantageously, the controller may approximate the depth of each point in the corrected point cloud using the already determined depth of the points in the reference coordinate system at block 1215. The controller proceeds to block 1235.

At block 1235, the controller assigns points of the corrected point cloud to projectors based on location. At block 1235, the points are assigned based which of the convex polygons the coordinates of the point in the corrected point cloud corresponds to, such that the points are assigned based on which projector may be used to project at the coordinate of the point. For example, the points in the first portion 700 of FIG. 7A are assigned to the first projector 105 as a result of the first convex polygon 510 representing the maximum area that may be illuminated by the first projector 105. In such an example, the points of the second portion 720 of FIG. 7B are assigned to the second projector 110 as a result of the second convex polygon 520 being used to generate the second portion 720. The controller may assign points with coordinates that correspond to both polygons to either or both of the projectors 105 or 110, such that photometric correction may be used when one or more points are assigned to a plurality of projectors. Advantageously, the convex polygons determined at block 1220 may be used to assign portion of the corrected point cloud to each projector, such that a point is assigned to the convex polygon that encloses the coordinates of the point. The controller proceeds to block 1240.

At block 1240, the controller generates a warp map by projecting the corrected point cloud onto a surface. The generated warp map represents a magnitude of distortion that is the result of the projection surface. The controller may determine a warp map, using an image of the corrected point cloud being projected onto the surface, as a result of the surface distorting the locations of the points including the corrected point cloud. For example, the controller 120 may configure the first projector 105 to project the first portion 700 onto the arbitrary surface 115, such that the first warp map 900 of FIG. 9A is the way in which the first portion 700 is perceived on the arbitrary surface 115. In some such example, the controller 120 may instruct the second projector 110 to project the second portion 720 onto the arbitrary surface 115, such that the second warp map 950 of FIG. 9B is visible on the arbitrary surface 115. The warp map generated as a result of projecting the corrected point cloud may be used to pre-distort an image to counter the effects of the warping caused by the surface. The projection system 100 may generate a warp map for each of the projectors 105 and 110 to pre-distort an image based on the distortions of the arbitrary surface across the image. Advantageously, the warp maps 900 and 950 represent the unique features of an arbitrary surface. Advantageously, images projected by the projection system 100 may be corrected based on the corrected point cloud, such that misalignments between a plurality of projectors may be corrected. The controller proceeds to block 1245.

At block 1245, the controller instructs the projectors to project geometrically corrected image by using the warp maps to distort an image. The controller may distort an image by comparing the geometric coordinates of a point in the corrected point cloud to the geometric coordinate of the point in the warp map. Then, the controller instructs the projectors to project the corrected images. The distortion of the content, prior to projecting the content, may counter distortions caused by the arbitrary surface 115. The distortion of the content, prior to projecting the content, may improve blending of edges between a first image being projected by the first projector 105 and a second image being projected by the second projector 110. For example, the controller 120 may decrease an x-axis coordinate of a first point in the image by a value as a result of determining the x-axis coordinate of the point in the first warp map 900 is greater than the x-axis coordinate of the point in the first portion 700. In such an example, the operation of adding the value to the x-axis coordinate of the point counters the operation of the distortion where the arbitrary surface 115 reduces the value of the x-axis coordinate of the point, such that the point is perceived to be at an undistorted location. Advantageously, the distortions of the image being projected are reduced as a result of distorting the image based on the warp map. Advantageously, each point of the warp map may be used to distort the image prior to projection, such that geometric correction may be implemented on an arbitrary surface with a plurality of features that cause distortions. The controller proceeds to end the process of geometric correction.

Although example methods are described with reference to the flowchart illustrated in FIG. 12, many other methods of geometric correction to reduce image distortions may alternatively be used in accordance with the in accordance with this description. For example, the order of execution of the blocks may be changed, and/or some of the blocks described may be changed, eliminated, or combined. Similarly, additional operations may be included in the manufacturing process before, in between, or after the blocks shown in the illustrated examples.

Figure 13:
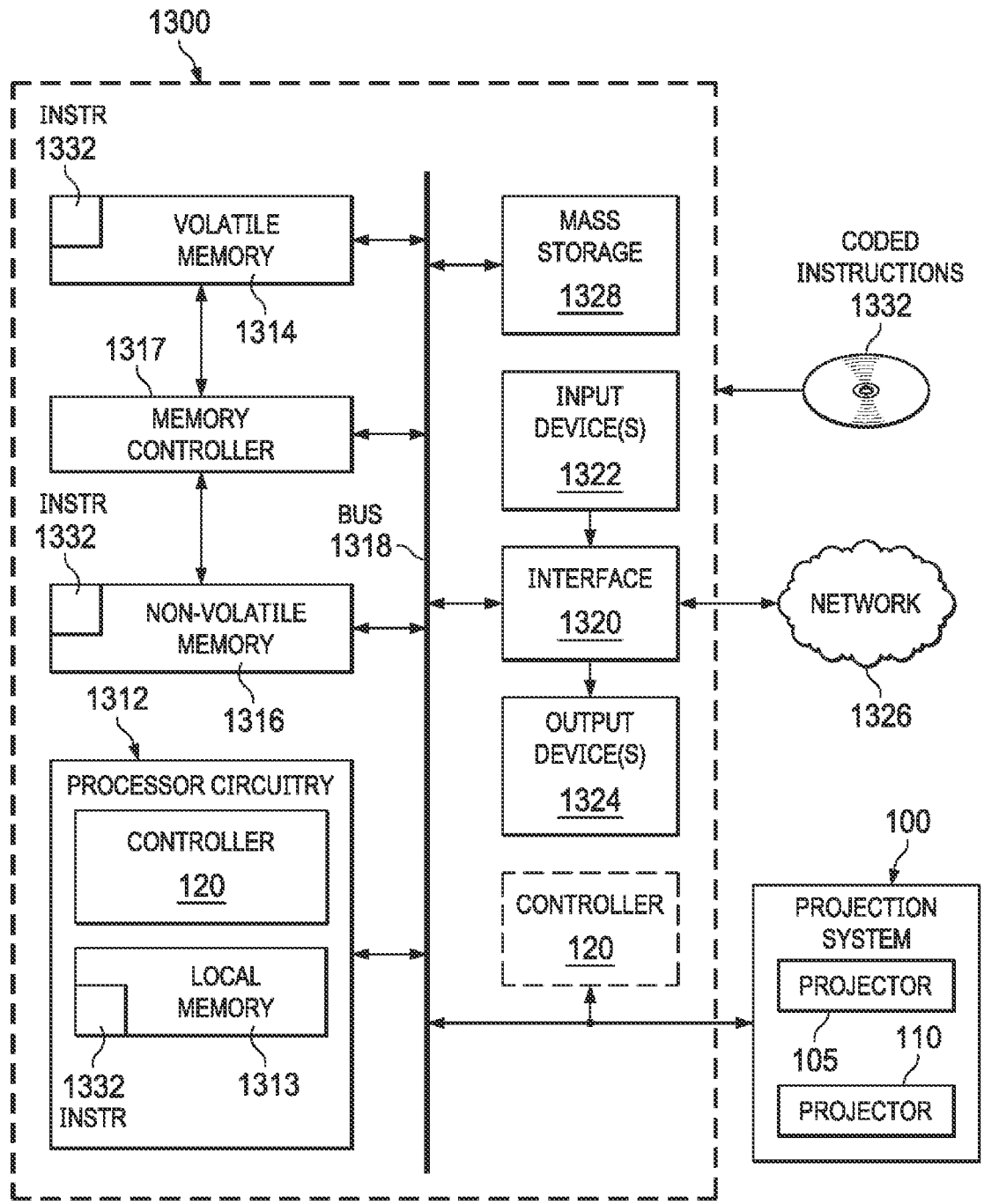
FIG. 13 is a block diagram of an example processor platform structured to execute and/or instantiate the machine readable instructions and/or the operations of FIG. 12.

FIG. 13 is a block diagram of an example processor platform 1300 structured to execute and/or instantiate the machine-readable instructions and/or the operations of FIG. 12. The processor platform 1300 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1300 of the illustrated example includes processor circuitry 1312. The processor circuitry 1312 of the illustrated example is hardware. For example, the processor circuitry 1312 can be implemented by one or more integrated circuits, logic circuits, field programmable gate arrays (FPGAs), microprocessors, central processing units (CPUs), graphical processing units (GPUs), digital signal processors (DSPs), and/or microcontrollers from any desired family or manufacturer. The processor circuitry 1312 may be implemented by one or more semiconductor based (e.g., silicon based) devices. In this example, the processor circuitry 1312 may implement the controller 120 of FIGS. 1 and 2.

The processor circuitry 1312 of the illustrated example includes a local memory 1313 (e.g., a cache, registers, etc.). The processor circuitry 1312 of the illustrated example is in communication with a main memory including a volatile memory 1314 and a non-volatile memory 1316 by a bus 1318. The volatile memory 1314 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1316 may be implemented by flash memory and/or any other desired type of memory device. Access to the main memory 1314, 1316 of the illustrated example is controlled by a memory controller 1317. In this example, the controller 120 of FIGS. 1 and 2 may be electrically coupled to the bus 1318. Alternatively, the projection system 100 of FIGS. 1 and 2 may be coupled to the bus 1318, such that the controller 120 may be implemented in the processor circuitry 1312.

The processor platform 1300 of the illustrated example also includes interface circuitry 1320. The interface circuitry 1320 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1322 are connected to the interface circuitry 1320. The input device(s) 1322 permit(s) a user to enter data and/or commands into the processor circuitry 1312. The input device(s) 1322 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1324 are also connected to the interface circuitry 1320 of the illustrated example. The output device(s) 1324 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1320 of the illustrated example, thus, typically includes a graphics driver card, a graphics driver chip, and/or graphics processor circuitry such as a GPU.

The interface circuitry 1320 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1326. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1300 of the illustrated example also includes one or more mass storage devices 1328 to store software and/or data. Examples of such mass storage devices 1328 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine executable instructions 1332, which may be implemented by the machine-readable instructions of FIG. 12, may be stored in the mass storage device 1328, in the volatile memory 1314, in the non-volatile memory 1316, and/or on one non-transitory computer readable storage medium such as a CD or DVD In this description, the term "and/or" (when used in a form such as A, B and/or C) refers to any combination or subset of A, B, C, such as: (a) A alone; (b) B alone; (c) C alone; (d) A with B; (e) A with C; (f) B with C; and (g) A with B and with C. Also, as used herein, the phrase "at least one of A or B" (or "at least one of A and B") refers to implementations including any of: (a) at least one A; (b) at least one B; and (c) at least one A and at least one B.

The term "couple" is used throughout the specification. The term may cover connections, communications, or signal paths that enable a functional relationship consistent with this description. For example, if device A provides a signal to control device B to perform an action, in a first example device A is coupled to device B, or in a second example device A is coupled to device B through intervening component C if intervening component C does not substantially alter the functional relationship between device A and device B such that device B is controlled by device A via the control signal provided by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal," "node," "interconnection", "pin" and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While the use of particular transistors are described herein, other transistors (or equivalent devices) may be used instead. For example, a p-type metal-oxide-silicon FET ("MOSFET") may be used in place of an n-type MOSFET with little or no changes to the circuit. Furthermore, other types of transistors may be used (such as bipolar junction transistors (BJTs)).

Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means+/−10 percent of the stated value.

Modifications are possible in the described embodiments, and other embodiments are possible, within the scope of the claims.

What is claimed is:

1. An apparatus comprising:
   a controller configurable to:
   generate a pattern of points;
   obtain a first image of a first reflection of a projection of the pattern of points from a first camera;
   generate a first point cloud having a first coordinate system responsive to the first image;
   obtain a second image of a second reflection of the projection of the pattern of points from a second camera;
   generate a second point cloud having a second coordinate system responsive to the second image;
   generate a rigid body transform to convert coordinates of the second coordinate system to coordinates of the first coordinate system;
   apply the rigid body transform to the second point cloud to generate a transformed point cloud; and
   generate a corrected point cloud responsive to the transformed point cloud.

2. The apparatus of claim 1, the apparatus further comprising a first projector coupled to the controller, a second projector coupled to the controller, the first camera coupled to the controller, and the second camera coupled to the controller, the first projector and the second projector configurable to project the pattern of points, the first camera and the second camera configurable to obtain the first image and the second image, respectively, of a reflection of the projection of the pattern of points.

3. The apparatus of claim 1, wherein the controller is further configurable to:
   generate a plurality of structured light patterns;
   obtain images of reflections of projections of the plurality of the structured light patterns using the first camera and the second camera; and
   determine coordinates of centroids of points comprising the structured light patterns as a result of comparing coordinates of points determined from obtained images of the plurality of structured light patterns.

4. The apparatus of claim 1, wherein generating the corrected point cloud comprises sampling to produce a rectangular point cloud within a convex polygon, the convex polygon around at least a portion of the transformed point cloud.

5. The apparatus of claim 1, wherein determining coordinates of points of the corrected point cloud comprises performing a bi-linear interpolation of points in the corrected point cloud.

6. The apparatus of claim 1, wherein the controller is further configurable to generate a warp map responsive to the corrected point cloud.

7. The apparatus of claim 6, wherein the controller is further configurable to warp a third image responsive to a comparison of coordinates of points of the corrected point cloud to coordinates of points of the warp map.

8. A system comprising:
   a first projector configurable to project a first projection of a pattern;
   a second projector configurable to project a second projection of the pattern;
   a first camera configurable to capture a first image of a reflection of the first projection of the pattern and the second projection of the pattern;
   a second camera configurable to capture a second image of the reflection of the first projection of the pattern and the second projection of the pattern; and
   a controller coupled to the first and second projectors and to the first and second cameras, the controller configurable to:
   generate a first point cloud of a first coordinate system responsive to the first image;
   generate a second point cloud of a second coordinate system responsive to the second image;
   generate a rigid body transform to convert coordinates in the second coordinate system to coordinates in the first coordinate system;
   apply the rigid body transform to the second point cloud to generate a transformed point cloud; and
   generate a corrected point cloud responsive to the transformed point cloud.

9. The system of claim 8, wherein the controller is further configurable to:
   generate a plurality of structured light patterns;
   obtain images of reflections of projections of the plurality of the structured light patterns using the first camera and the second camera; and
   determine coordinates of centroids of points comprising the structured light patterns as a result of comparing coordinates of points to coordinates determined from obtained images of the plurality of structured light patterns.

10. The system of claim 8, wherein generating the corrected point cloud comprises sampling a rectangular point cloud within a convex polygon, the convex polygon around at least a portion of the transformed point cloud.

11. The system of claim 8, wherein determining coordinates of points of the corrected point cloud comprises performing a bi-linear interpolation of points in the corrected point cloud.

12. The system of claim 8, wherein the controller is further configurable to generate a warp map responsive to the corrected point cloud.

13. The system of claim 12, wherein the controller is further configurable to warp an image responsive to a comparison of coordinates of points of the corrected point cloud to coordinates of points of the warp map.

14. A method comprising:
   instructing, by a controller, a projector to project a pattern of points;
   capturing, by a first camera, a first image of a reflection of the pattern of points;

generating, by the controller, a first point cloud of a first coordinate system responsive to the first image;

capturing, by a second camera, a second image of the reflection of the pattern of points;

generating, by the controller, a second point cloud of a second coordinate system responsive to the second image;

generating, by the controller, a rigid body transform to convert coordinates in the second coordinate system to coordinates in the first coordinate system;

applying, by the controller, the rigid body transform to the second point cloud to generate a transformed point cloud; and generating, by the controller, a corrected point cloud responsive to the transformed point cloud.

15. The method of claim 14, wherein the method further comprises:

generating a plurality of structured light patterns;

obtaining images of reflections of projections of the plurality of the structured light patterns using the first camera and the second camera; and determining coordinates of centroids of points comprising the structured light patterns as ca result of comparing coordinates of points to coordinates determined from obtained images of the plurality of structured light patterns.

16. The method of claim 14, wherein generating the corrected point cloud comprises sampling a rectangular point cloud within a convex polygon, the convex polygon around at least a portion of the transformed point cloud.

17. The method of claim 14, wherein determining coordinates of points of the corrected point cloud comprises performing a bi-linear interpolation of points in the corrected point cloud.

18. The method of claim 14, wherein the method further comprises generating, by the controller, a warp map responsive to the corrected point cloud.

19. The method of claim 18, wherein the method further comprises warping content responsive to a comparison of coordinates of points of the corrected point cloud to coordinates of points of the warp map.

* * * * *